(12) United States Patent
Martin

(10) Patent No.: US 11,654,770 B1
(45) Date of Patent: *May 23, 2023

(54) LIMITING CAR BEHAVIOR BASED ON A PRE-SET DRIVER PROFILE ENABLED BY FACE RECOGNITION

(71) Applicant: Ambarella International LP, Santa Clara, CA (US)

(72) Inventor: Patrick Martin, Rochester, MI (US)

(73) Assignee: Ambarella International LP, Santa Clara, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/218,164

(22) Filed: Mar. 31, 2021

Related U.S. Application Data

(63) Continuation of application No. 16/132,677, filed on Sep. 17, 2018, now Pat. No. 11,040,619, which is a
(Continued)

(51) Int. Cl.
| | |
|---|---|
| *B60K 28/02* | (2006.01) |
| *B60W 50/14* | (2020.01) |
| *B60Q 9/00* | (2006.01) |
| *G06N 3/08* | (2023.01) |
| *G06T 7/593* | (2017.01) |
| *G06V 20/59* | (2022.01) |

(Continued)

(52) U.S. Cl.
CPC ............. *B60K 28/02* (2013.01); *B60Q 9/00* (2013.01); *B60W 50/14* (2013.01); *G06F 18/214* (2023.01); *G06N 3/08* (2013.01); *G06T 7/593* (2017.01); *G06V 20/597* (2022.01); *G06V 40/10* (2022.01); *G06V 40/168* (2022.01); *G06V 40/172* (2022.01); *B60W 2540/043* (2020.02); *B60W 2540/30* (2013.01); *G06F 18/22* (2023.01); *G06F 18/25* (2023.01); *G06T 2207/10021* (2013.01); *G06T 2207/10028* (2013.01); *G06T 2207/30268* (2013.01); *H04N 13/239* (2018.05); *H04N 2013/0081* (2013.01)

(58) Field of Classification Search
None
See application file for complete search history.

(56) References Cited

U.S. PATENT DOCUMENTS

| | | | |
|---|---|---|---|
| 9,171,268 B1 * | 10/2015 | Penilla | B60L 1/06 |
| 2006/0080011 A1 * | 4/2006 | Gaboury | G01S 13/931 |
| | | | 701/29.7 |

(Continued)

*Primary Examiner* — Adam D Tissot
*Assistant Examiner* — Garrett F Evans
(74) *Attorney, Agent, or Firm* — Christopher P. Maiorana, PC

(57) ABSTRACT

An apparatus including a capture device and a processor. The capture device may be configured to generate a plurality of video frames corresponding to users of a vehicle. The processor may be configured to perform operations to detect objects in the video frames, detect users of the vehicle based on the objects detected in the video frames, determine a limitation profile for the users, monitor for conditions provided by the limitation profile and generate a reaction if one or more of the conditions are met. The limitation profile may be determined in response to characteristics of the users. The characteristics of the users may be determined by performing the operations on each of the users.

20 Claims, 16 Drawing Sheets

Related U.S. Application Data continuation-in-part of application No. 16/118,787, filed on Aug. 31, 2018, now Pat. No. 10,850,693, and a continuation-in-part of application No. 16/033,724, filed on Jul. 12, 2018, now Pat. No. 10,956,759, and a continuation-in-part of application No. 16/001,242, filed on Jun. 6, 2018, now Pat. No. 10,953,850, and a continuation-in-part of application No. 15/965,891, filed on Apr. 28, 2018, now Pat. No. 10,967,824.

(60) Provisional application No. 62/653,008, filed on Apr. 5, 2018.

(51) Int. Cl.
| | | |
|---|---|---|
| *G06V 40/10* | (2022.01) | |
| *G06V 40/16* | (2022.01) | |
| *G06F 18/214* | (2023.01) | |
| H04N 13/00 | (2018.01) | |
| H04N 13/239 | (2018.01) | |
| G06F 18/22 | (2023.01) | |
| G06F 18/25 | (2023.01) | |

(56) References Cited

U.S. PATENT DOCUMENTS

| | | | |
|---|---|---|---|
| 2007/0183651 A1* | 8/2007 | Comaniciu | G06V 20/59 382/154 |
| 2014/0310277 A1* | 10/2014 | Ricci | H04W 76/11 707/736 |
| 2016/0148079 A1* | 5/2016 | Shen | G06V 10/7747 382/157 |
| 2018/0330178 A1* | 11/2018 | el Kaliouby | B60W 50/14 |
| 2019/0026538 A1* | 1/2019 | Wang | G06V 10/764 |

* cited by examiner

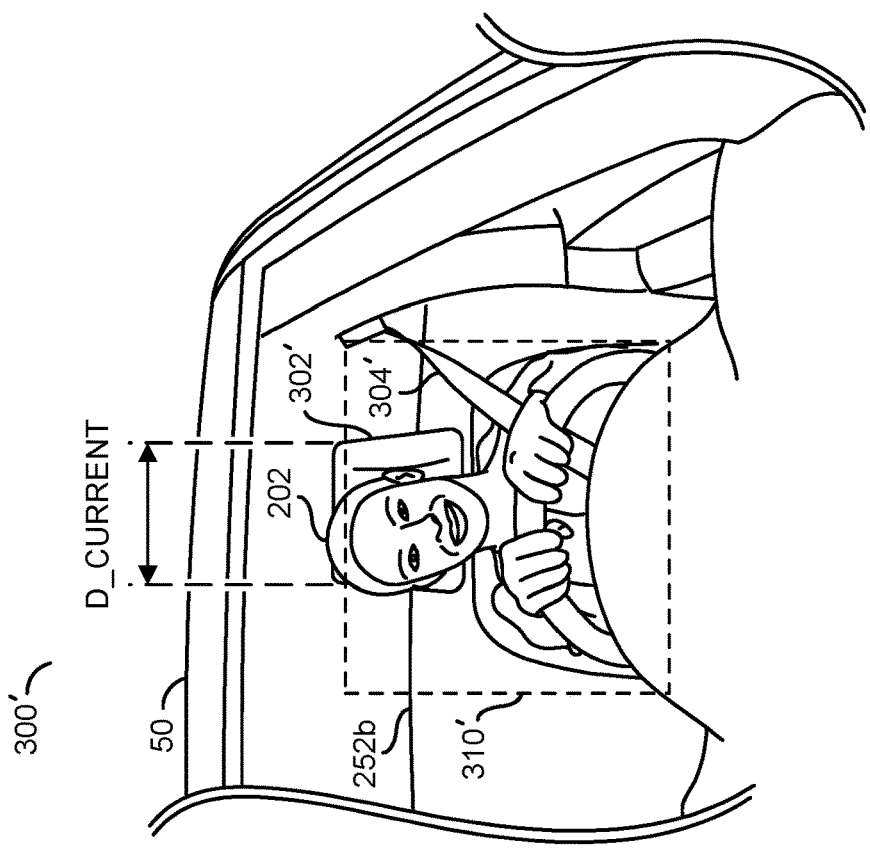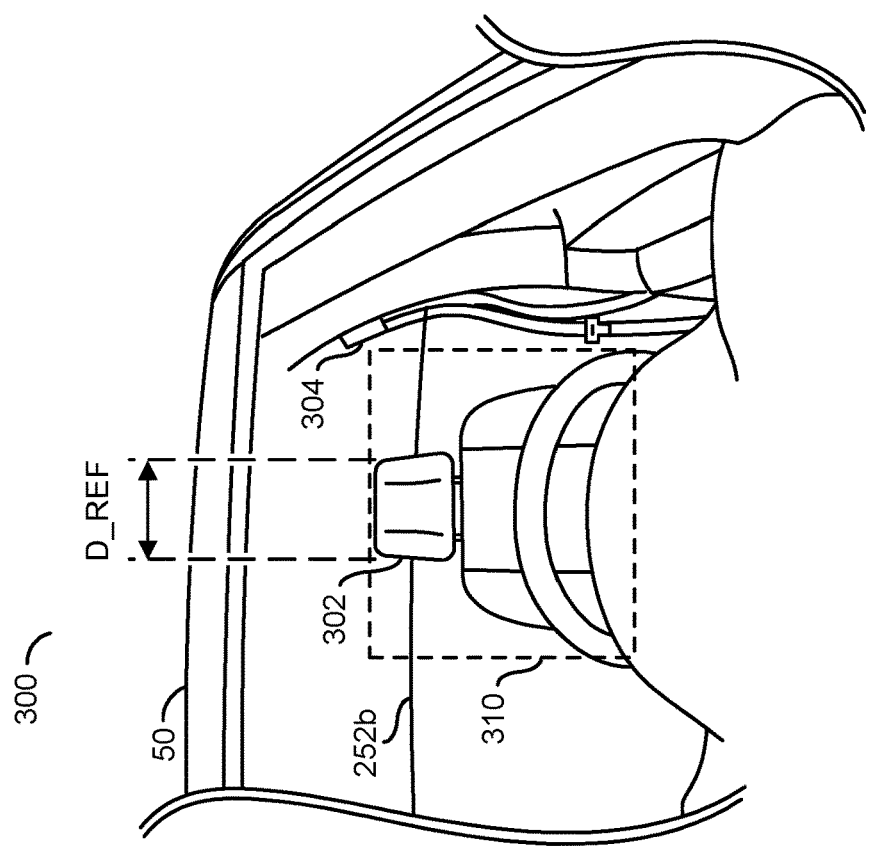
FIG. 4

LIMITING CAR BEHAVIOR BASED ON A PRE-SET DRIVER PROFILE ENABLED BY FACE RECOGNITION

This application relates to U.S. Ser. No. 16/132,677, filed, Sep. 17, 2018, which relates to U.S. Ser. No. 15/965,891, filed Apr. 28, 2018, which relates to U.S. Provisional Application No. 62/653,008, filed Apr. 5, 2018. This application also relates to U.S. Ser. No. 16/001,242, filed Jun. 6, 2018, U.S. Ser. No. 16/033,724, filed Jul. 12, 2018 and U.S. Ser. No. 16/118,787, filed Aug. 31, 2018. Each of the mentioned applications are hereby incorporated by reference in its entirety.

FIELD OF THE INVENTION

The invention relates to computer vision generally and, more particularly, to a method and/or apparatus for implementing limiting car behavior based on a pre-set driver profile enabled by face recognition.

BACKGROUND

Many vehicle owners share a vehicle with other people (i.e., multiple family members use the same car). Different drivers have different capabilities, levels of experience, or levels of self-control. Some parent want to let their children use the family vehicle but want to impose some limitations on vehicle usage. For example, many young drivers drive too fast in order to impress their friends. Some drivers might have limitations on where they can be at certain times of day. For example, teenagers often have curfews. In another example, probation conditions might limit where people are allowed to be and when.

When sharing a vehicle, various limitations on use might be suitable for one driver, but not another. Parents might want to limit their child from driving fast on the freeway, but the parents might need to drive fast on the freeway daily to get to work. A limitation on the vehicle for all drivers is not a suitable solution. In order to set specific limitations for individual drivers, there would need to be an accurate method of distinguishing between different drivers.

It would be desirable to implement limiting car behavior based on a pre-set driver profile enabled by face recognition.

SUMMARY

The invention concerns an apparatus comprising a capture device and a processor. The capture device may be configured to generate a plurality of video frames corresponding to users of a vehicle. The processor may be configured to perform operations to detect objects in the video frames, detect users of the vehicle based on the objects detected in the video frames, determine a limitation profile for the users, monitor for conditions provided by the limitation profile and generate a reaction if one or more of the conditions are met. The limitation profile may be determined in response to characteristics of the users. The characteristics of the users may be determined by performing the operations on each of the users.

BRIEF DESCRIPTION OF THE FIGURES

Embodiments of the invention will be apparent from the following detailed description and the appended claims and drawings in which:

FIG. 4 is a diagram illustrating an object comparison between a reference video frame and a captured video frame;

DETAILED DESCRIPTION OF THE EMBODIMENTS

Embodiments of the present invention include providing limiting car behavior based on a pre-set driver profile enabled by face recognition that may (i) utilize interior cameras of a vehicle, (ii) provide limitation profiles for individual users of a vehicle using facial recognition, (iii) provide different limitation options for each driver, (iv) accurately distinguish between different drivers, (v) determine characteristics of occupants of a vehicle, (vi) implement fleet learning to train a convolutional neural network, (vii) utilize computer vision with sensor fusion and/or (viii) be implemented as one or more integrated circuits.

Embodiments of the present invention may utilize interior cameras and communication systems of vehicles (e.g., 3G, 4G, LTE, 5G, etc.). The present invention may implement computer vision to determine information about the interior and/or exterior of a vehicle. Using computer vision, embodiments of the present invention may classify and/or determine characteristics of objects in a vehicle (e.g., occupants, seats, steering wheels, handheld devices, seatbelts, etc.). In an example, body characteristics of an occupant may be analyzed to select a limitation profile for the occupant in a particular seat. In another example, facial recognition may be implemented to select a limitation profile for a particular individual. Once a limitation profile is selected for a particular user then a reaction may be performed to adjust various vehicle characteristics (e.g., geo-restrictions, speed limitations, acceleration limitations, infotainment center settings, etc.) when pre-set conditions are met. By using computer vision to determine and/or understand the characteristics of each occupant of the vehicle, different drivers may be accurately identified to ensure specified limitations may be imposed without inconveniencing other drivers that do not have the same limitations.

Figure 1:
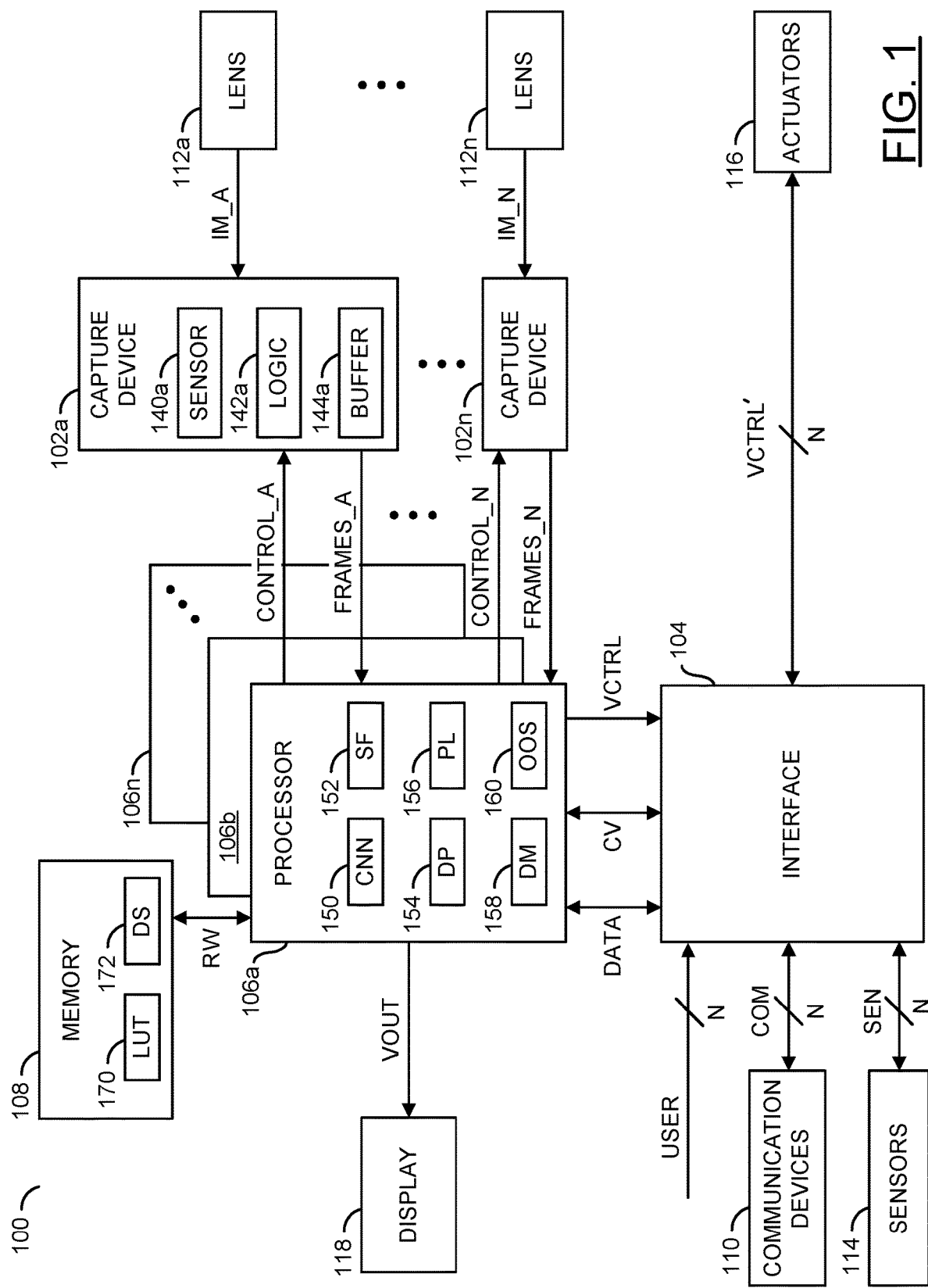
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or a block (or circuit) 118. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuit 118 may implement a display. The apparatus 100 may comprise other components (not shown). The number, type and/or arrangement of the components of the apparatus 100 may be varied according to the design criteria of a particular implementation.

In various embodiments of the apparatus 100, the components 102a-118 may be implemented as a distributed camera system 100. In the distributed system embodiment of the apparatus 100, each component may be implemented separately throughout an installation location (e.g., such as a vehicle). In some embodiments of the apparatus 100, the components 102a-118 may be implemented on a printed circuit board (e.g., a single module). In the single module embodiment, each component may be connected to a single module (e.g., such as a circuit board on a small device such as a drone). In some embodiments, some of the components 102a-118 may be implemented on a single module and some of the components 102a-118 may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle).

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118 may be implemented as part of another one of the components 102a-118. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., the display 118).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, a signal (e.g., VOUT) and/or send/receive the signal DATA, the signal CV and/or a signal (e.g., RW). The signal VOUT may provide a video data output to the display 118. The signal RW may communicate data to/from the memory 108. The signal VOUT, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170 and/or a block (or circuit) 172. The block 170 may implement a look up table. The block 172 may implement data storage. The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The display 118 may be a screen and/or an output device. In one example, the display 118 may implement an electronic mirror (e.g., an e-mirror). In another example, the display 118 may implement a touchscreen for an infotainment system. In yet another example, the display 118 may implement a back-up camera and/or bird's eye view camera. The display 118 may display a version of video frames captured by one or more of the lenses 112a-112n and/or the capture devices 102a-102n. The video frames captured by the capture device 102a-102n may be cropped, adjusted and/or encoded by the processors 106a-106n to fit the display 118. For example, the processor 106a-106n may provide real-time video streaming to the display 118 via the signal VOUT.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision implemented by the CNN module 150 may be described in association with FIG. 5.

The sensor fusion module 152 may be configured to analyze information from multiple sensors 114 and/or capture devices 102a-102n for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.) and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection and/or high dynamic range processing. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module

156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the display 118 (e.g., the signal VOUT).

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of the display 118 by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the display 118. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signal VOUT may be an encoded, cropped, stitched and/or enhanced version of one or more of the signals FRAMES_A-FRAMES_N. The signal VOUT may be a high resolution, digital, encoded, de-warped, stabilized, cropped, blended, stitched and/or rolling shutter effect corrected version of the signals FRAMES_A-FRAMES_N.

Figure 2:
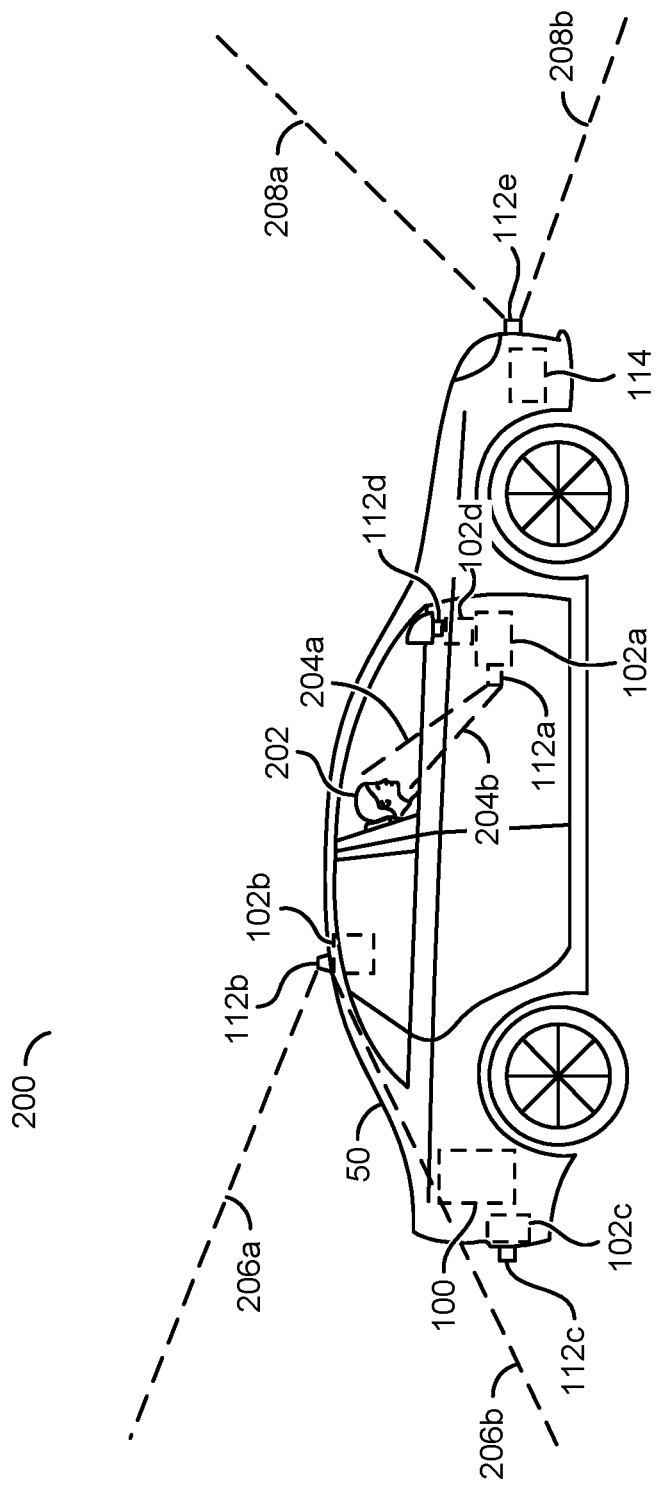
FIG. 2 is a diagram illustrating an example of camera systems inside and outside of a vehicle.

Referring to FIG. 2, an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be implemented to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
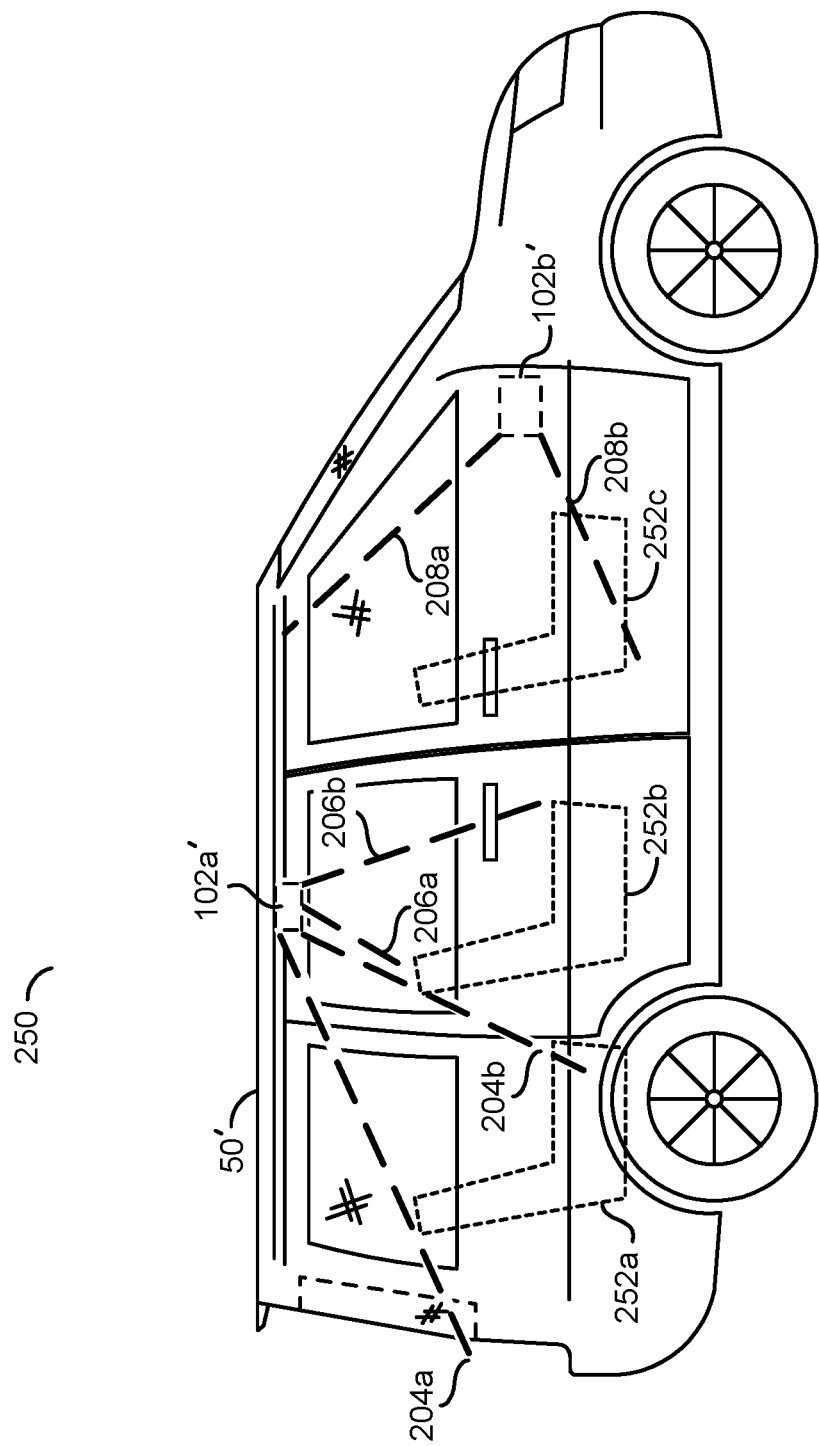
FIG. 3 is a diagram illustrating an example of interior camera systems configured to monitor vehicle occupants.

Referring to FIG. 3, a diagram illustrating an example 250 of interior camera systems configured to monitor vehicle occupants is shown. Various camera angles of an interior of the vehicle 50' are shown. Multiple rows of seats 252a-252c are shown in the vehicle 50'. Each of the rows of seats 252a-252c may be monitored to detect and/or classify one or more occupants of the vehicle 50'.

The capture device 102a' is shown mounted on a ceiling of the vehicle 50'. The capture device 102a' is shown having an angle 204a and an angle 204b (e.g., a field of view) that points toward the back row of seats 252a. The capture device 102a' may also have a field of view angle 206a-206b to capture the middle row of seats 252b. In another example, the capture device 102a' may implement a wide angle lens to capture both rows of seats. The field of view from the angle 204a and the angle 204b may provide a targeted view of the interior of the vehicle 50'. Similarly, the capture device 102b' may capture an interior of the vehicle 50'. An angle 208a and an angle 208b may represent a field of view capturing the front row of seats 252c. The multiple fields of view captured by the capture devices 102a'-102n' may be a targeted wide angle view of the interior of the vehicle 50'. The number of angles and/or fields of view may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver, other occupants, physical characteristics of people in the vehicle, facial expressions of people in the vehicle, fields of view of the people in the vehicle, etc.). The processors 106a-106n may be configured to determine an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person. For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands) and/or determine a vulnerability of an occupant (e.g., a non-moving occupant may be asleep and/or unconscious).

In some embodiments, the processors 106a-106n may implement depth-sensing techniques. The depth-sensing techniques may compare knowledge of the dimensions of the vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the vehicle 50' was parked, when the vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to the display 118 (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

Referring to FIG. 4, a diagram illustrating an object comparison between a reference video frame 300 and a current video frame 300' is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., to be described in more detail in association with FIG. 5). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat of the rows 252a-252c, the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., D REF) of the reference object 302 (e.g., based on the number of pixels occupied in the reference video frame 300). In some embodiments, the look up table 170 may store the width D REF. The width D REF may be determined when the reference object 302 is at a known distance from the lens 112a.

In the example reference video frame 300, a reference object 304 is shown. In the example shown, the reference object 304 may be a driver seat belt. The CNN module 150 may determine a location of the seat belt 304 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver).

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 106a-106n may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D CURRENT to the reference size D REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 5:
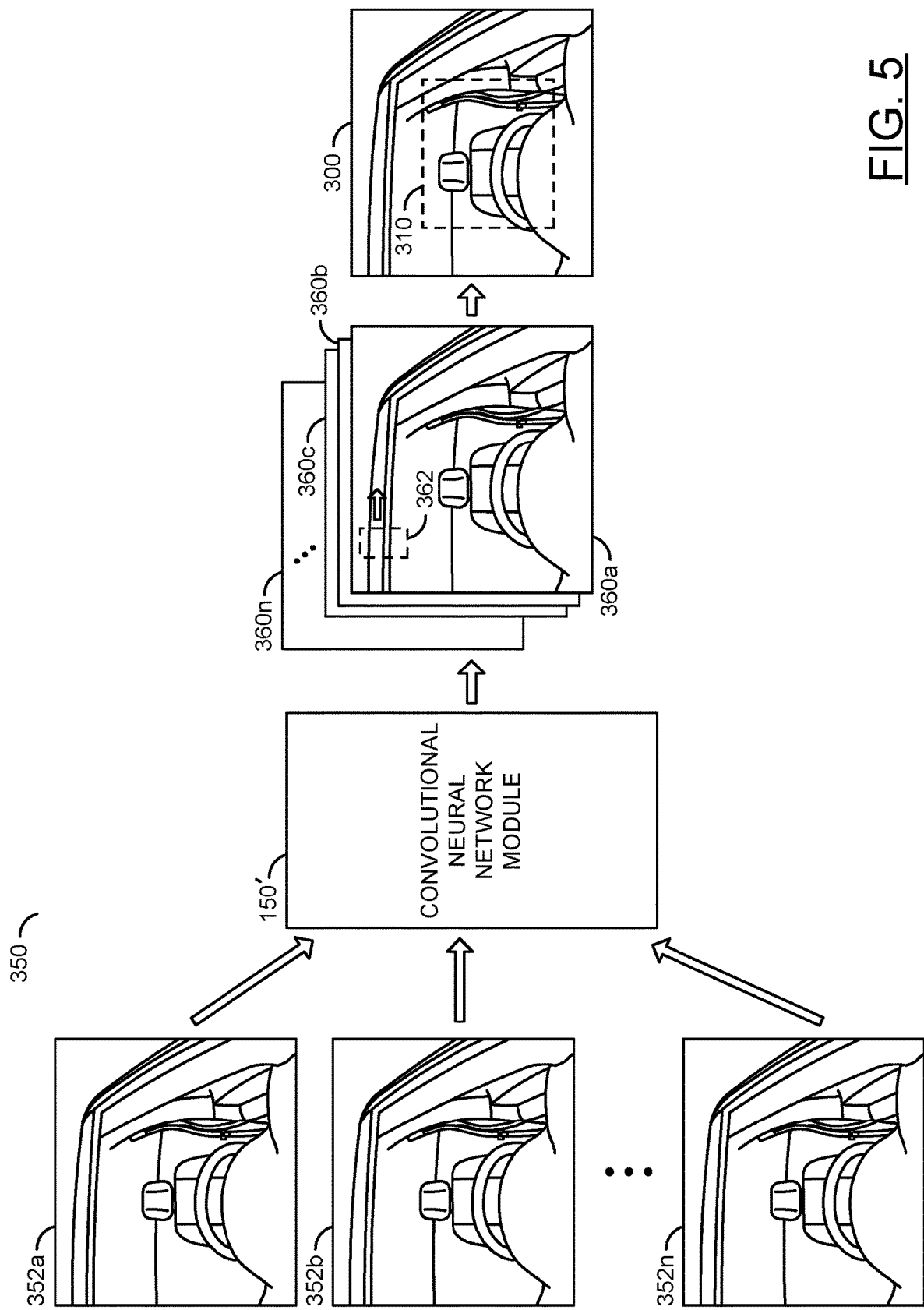
FIG. 5 is a diagram illustrating an example visualization of training a convolutional neural network for object detection using fleet learning.

Referring to FIG. 5, a diagram illustrating an example visualization 350 of training the convolutional neural network 150' for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an unoccupied interior of a vehicle. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, $YC_bC_r$, $YP_bP_r$, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

Figure 6:
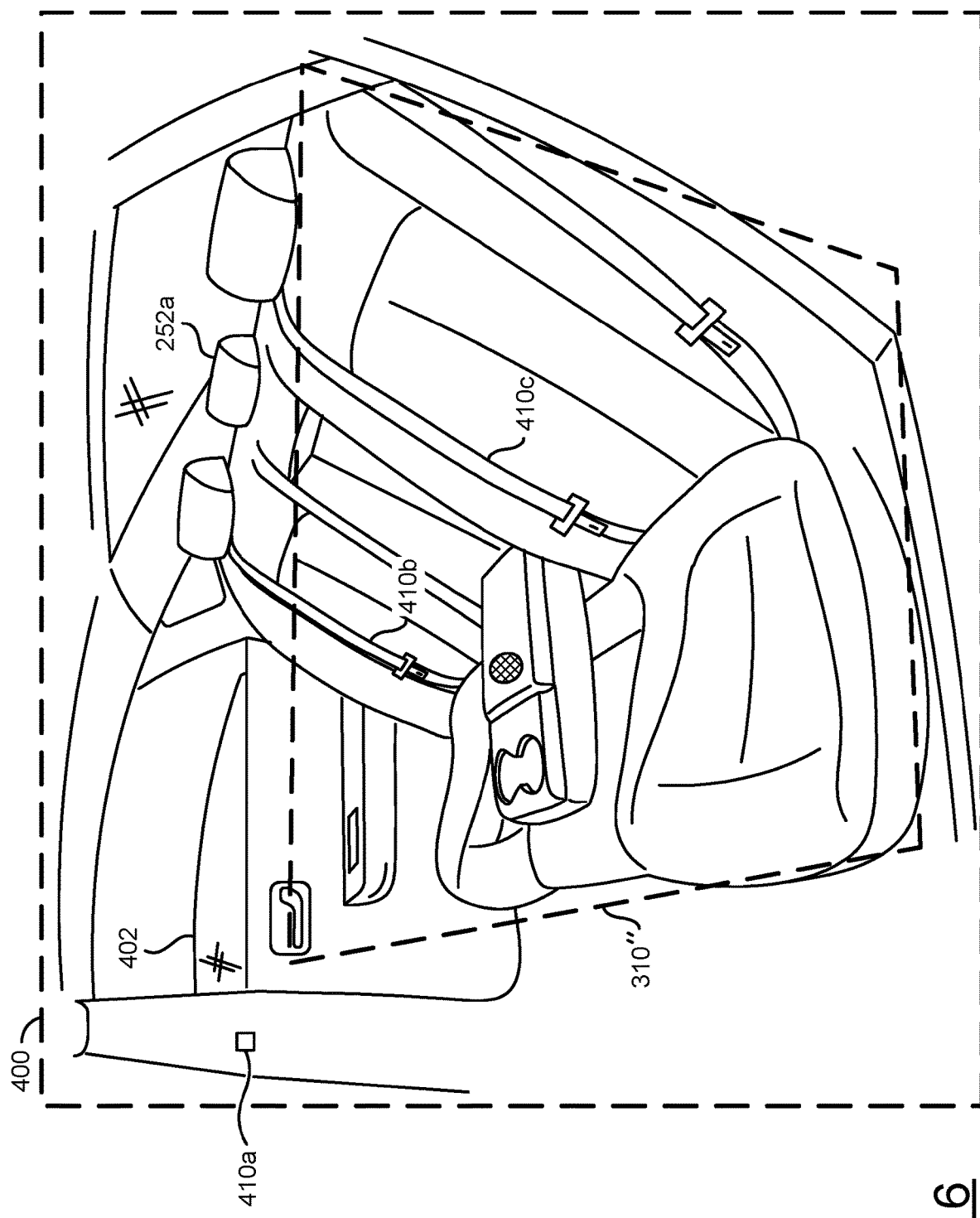
FIG. 6 is a diagram illustrating detecting reference objects corresponding to an empty vehicle seat in a video frame.

Referring to FIG. 6, a diagram illustrating detecting reference objects 310" corresponding to an empty vehicle seat in a video frame 400 is shown. The video frame 400 may be video data (e.g., one example video frame from a series of video frames in the video data) of the interior of the vehicle 50. The video frame 400 may be an example targeted wide angle view of the interior of the vehicle 50 captured by one of the capture devices 102a-102n. The video frame 400 is shown directed at the back row of seats 252a.

In some embodiments, the video frame 400 may be an example of reference frame. For example, the reference frame 400 may be used by the apparatus 100 to learn the locations of various reference objects in the vehicle 50. In another example, the video frame 400 may be used as video data for the training data 352a-352n. In yet another example, the video frame 400 may be an example of a current video frame undergoing the computer vision operations.

An open window 402 is shown in the video frame 400. In some embodiments, the locations of windows may be used to train the CNN module 150. In some embodiments, the processors 106a-106n may determine characteristics of various objects detected in the video frame 400. In the example shown, the processors 106a-106n may determine the characteristic of the window 402 is open.

Examples of mitigation responses 410a-410c are shown in the video frame 400. In some embodiments, the mitigation responses 410a-410c may be deployed and/or activated in response to a collision and/or an imminent collision. For example, the capture devices 102a-102n that provide an exterior view from the vehicle 50 may determine that an impact, collision and/or evasive maneuver is imminent by analyzing the video data and/or using the sensor fusion module 152 to analyze the sensors 114. To protect occupants of the vehicle 50, the mitigation responses 410a-410c may be deployed (e.g., before the impact and/or when the impact is detected). The apparatus 100 may generate the signal VCTRL' to activate one or more of the actuators 116. The actuators 116 may be used to operate on the mitigation response devices 410a-410c.

In the example shown, the mitigation response device 410a may be an air bag (e.g., a side air bag). In the example shown, the mitigation response device 410b and/or the mitigation device 410c may be seatbelts. For example, in response to the imminent collision, the actuators 116 may activate seatbelt pre-tensioning for the seatbelts 410b-410c. In another example, in response to the imminent collision, the actuators 116 may deploy the air bag 410a. The number and/or types of the mitigation response devices 410a-410c implemented may be varied according to the design criteria of a particular implementation. For example, the interface 104 may translate instructions from the processors 106a-106n to corresponding signals compatible with the actuators 116. In some embodiments, the interface 104 may provide an API for the actuators 116. For example, the interface 104 may translate a command to slow down from the processors 106a-106n based on the available actuators 116.

An example detected object 310" is shown. The example detected object 310" may be an unoccupied seat. In some embodiments, the unoccupied seat 310" may be a reference object used for comparison when a person is in the same seat in another video frame. In some embodiments, when the video frame 400 is a current video frame, the unoccupied seat 310" may represent a portion of the vehicle 50 that is the least vulnerable and/or not vulnerable. For example, if the unoccupied seat 310" does not have an occupant, then any mitigation reactions initiated by the apparatus 100 for the unoccupied seat 310" may be considered a low priority.

Figure 7:
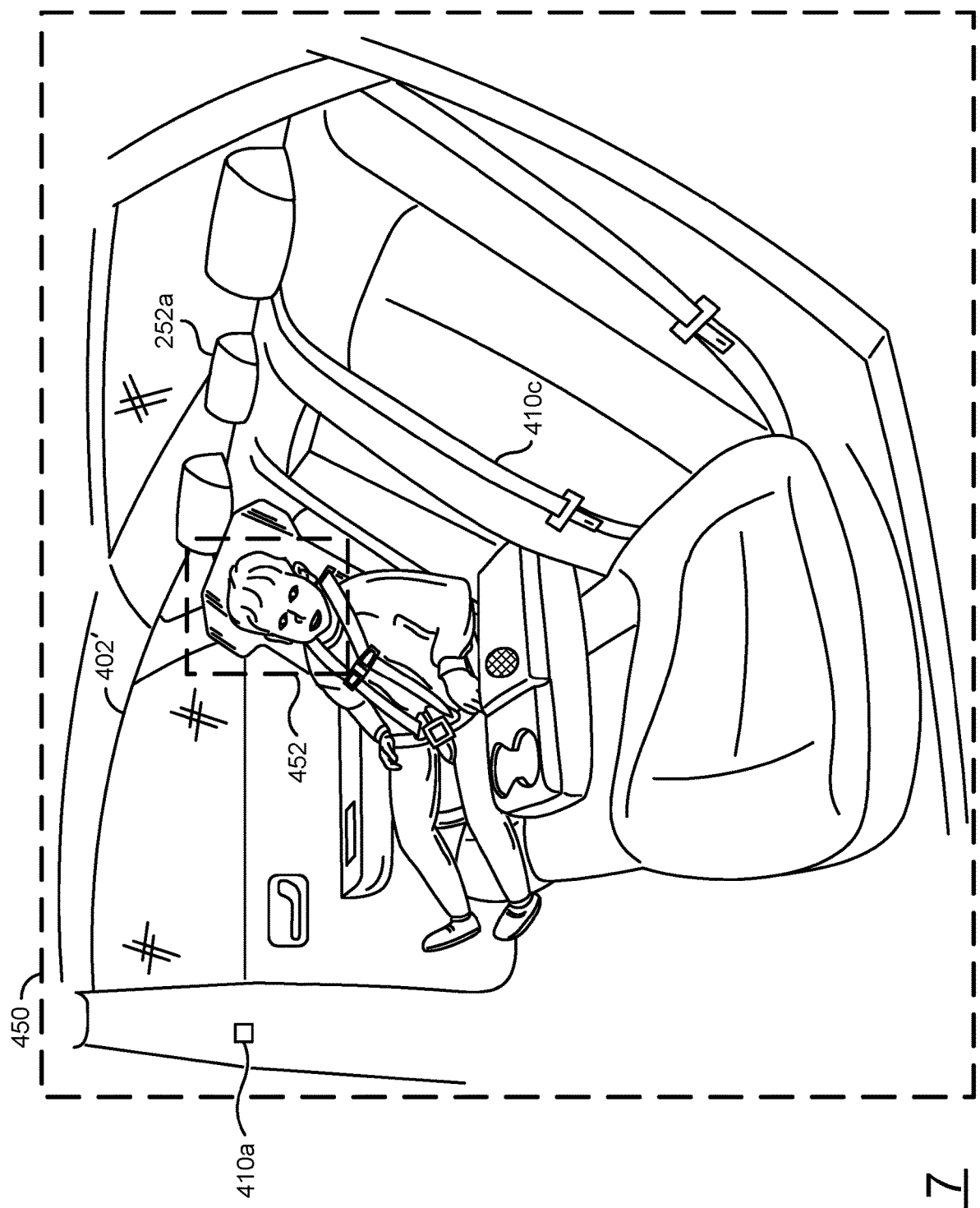
FIG. 7 is a diagram illustrating detecting a child in a video frame.

Referring to FIG. 7 a diagram illustrating detecting an occupant in a video frame 450 is shown. The video frame 450 may be video data (e.g., one example video frame from a series of video frames in the video data) of the interior of the vehicle 50. The video frame 450 may be generated similar to the video frame 400 (e.g., described in association with FIG. 6).

The video frame 450 is shown directed at the back row of seats 252a. An occupant 452 is shown in the video frame 450. In the example shown, the occupant 452 may be a small child. The small child 452 may be an example of a vulnerable occupant.

Generally, the driving policy module 154 may determine a vulnerability of the occupant 452. In some embodiments, different product vendors may program the driving policy module 154 with preferences on how to rank the vulnerability of the occupant 452. In some embodiments, the driving policy module 154 may be programmed according to local regulations. How the vulnerability of the occupant 452 is determined may be varied according to the design criteria of a particular implementation.

The processors 106a-106n may utilize the CNN module 150 to identify, detect and/or classify the occupant 452 (e.g., as a small child, in the example shown). The CNN module 150 may implement the computer vision operations to determine the characteristics of the occupant 452 (e.g., age, body position, whether the occupant is pregnant, etc.). The processors 106a-106n may utilize the classification of the occupant 452 and/or the characteristics of the occupant 452 determined using the computer vision operations in conjunction with the driving policy module 154 to determine the vulnerability of the occupant 452.

The level and/or rank of vulnerability determined by the processors 106a-106n may not imply a weakness, frailty and/or importance of the occupants 452. For example, in a traditional emergency situation, saving women and children is often prioritized. The vulnerability may comprise a likelihood of harm and/or a need for protection. For example, the occupant 452 that is closer to the impact point may be more vulnerable than another of the occupants 452. In another example, particular body parts (e.g., head, chest, arteries, etc.) may be more vulnerable than other body parts due to the risk of catastrophic injury. The level and/or rank of vulnerability of a particular occupant may change (e.g., more vulnerable if a vital body part is exposed, more vulnerable if not wearing a seat belt, less vulnerable if wearing a helmet, etc.). The level and/or rank of vulnerability may be used to prioritize which of the occupants 452 to protect when selecting the impact mitigation reaction.

In one example, a baby may be considered a highly vulnerable occupant. In another example, a healthy adult may be considered less vulnerable than a child. In yet another example, an elderly person may be considered more vulnerable than a healthy adult. In still another example, a person who is pregnant may be considered highly vulnerable. In another example, an empty seat may have the lowest vulnerability ranking since there may be nothing to protect. In yet another example, a pet may be considered less vulnerable than a child. In some embodiments, inanimate objects may have some degree of vulnerability compared to other objects (e.g., a highly valued object might be more important to protect than a worthless item). The level of vulnerability for the occupant 452 may be varied according to the design criteria of a particular implementation.

Generally, each occupant 452 of the vehicle 50 may be detected by the processors 106a-106n. The processors 106a-106n may determine various characteristics of the occupants 452 to determine how vulnerable each occupant may be. Each occupant 452 may be accorded a level of vulnerability according to the driving policy module 154. In an example, the level of vulnerability may enable the processor 106a-106n to rank a vulnerability of each of the occupants (e.g., from highest to lowest).

In some embodiments, based on the vulnerability ranking, the processors 106a-106n may determine how to prioritize any impact mitigation reactions. For example, the safety of a person carrying a child may be prioritized over a healthy adult since the healthy adult may be more likely to withstand injury.

In some embodiments, the processors 106a-106n may implement the computer vision operations to understand how a person may be vulnerable. In an example, a healthy adult may be vulnerable if the adult is riding in the passenger seat having a body position with feet resting on the dashboard (e.g., deploying an air bag as an impact mitigation reaction may cause more harm based on the body position). In another example, particular areas of the body of the occupants 452 may be more vulnerable (e.g., the midsection of a pregnant woman may be more vulnerable than the shoulders of the same person). How the vulnerability of occupants 452 are ranked and/or how different areas of the body of each occupant 452 are ranked may be varied according to the design criteria of a particular implementation.

The CNN module 150 may be configured to classify objects as the occupant 452. The CNN module 150 may further classify the occupant as a particular type and/or class of occupant (e.g., a child, a pet, an adult, an elderly person, a differently-abled person, etc.). The CNN module 150 may further determine characteristics of the occupant 452 based on the characteristics detected. The processor 106a-106n and/or the driving policy module 154 may determine a vulnerability of the occupant 452 based on the classification and/or the characteristics detected using the computer vision operations. The types of object classifications may be varied according to the design criteria of a particular implementation.

The video analytics and/or computer vision operations performed by the CNN module 150 may process the video frame 450 and/or other video signals for biometric markers to determine the characteristics of the occupant 452. For example, one or more of age, height and/or weight may be biometric markers used to determine the vulnerability of the occupant 452. The biometric markers may be used to differentiate between a child, an adolescent, etc. (e.g., a person that may not be capable of protecting themselves) and a young adult, teenager, adult, etc. (e.g., a person that may be less vulnerable).

In some embodiments, the age, height, weight and/or other biometric markers (e.g., characteristics) used to determine the vulnerability of the occupant 452 may be similar to attributes used in regulations for sitting in the front seat of a vehicle and/or other vehicle safety regulations. Various biometric markers may be stored as reference data in the look up table 170. For example, the look up table 170 may store different heights, weights, ages, etc. applicable to different regions (e.g., based on different regulations in a particular city/state/province/country). The types of biometric markers used to determine a vulnerability of the occupant 452 may be varied according to the design criteria of a particular implementation.

In some embodiments, the CNN module 150 may be configured to detect faces in the video frame 450. In some embodiments, the processor 106a-106n may be configured to recognize faces through facial recognition (e.g., based on faces stored as references in the memory 108). The vulnerability of the occupant 452 may be stored in the look up table 170 in association with the facial detection information corresponding to the occupant 452.

A high confidence level for a vulnerability and/or detection of a particular occupant may indicate that the computer vision result is consistent with the particular type of object (e.g., occupant). A low confidence for a vulnerability and/or detection of a particular occupant may indicate that the computer vision result is inconsistent with the particular type of object (e.g., occupant). Various checks may be performed to determine the confidence level. The vulnerability ranking may be performed when the confidence level is above a pre-defined threshold. In some embodiments, information from the vehicle sensors 114 (e.g., an amount of weight detected in a particular seat) may be used to adjust the confidence level.

The impact mitigation may comprise automatic responses by the vehicle 50 (e.g., using the actuators 116) implemented to improve a safety, reduce an amount of injury, increase a chance of survival and/or improve comfort of the occupant 452. For example, the processors 106a-106n may generate the signal VCTRL to the interface 104 and the interface 104 may forward the signal VCTRL' to the appropriate one of the actuators 116 to perform the impact mitigation reaction.

In some embodiments, the window 402' may be one of the mitigation response devices 410a-410c. In the example shown, the window 402' may be determined by the computer vision operations to be in a closed state. For example, opening the window 402' may be an appropriate impact mitigation response to enable the occupant 452 to escape a vehicle after a collision and/or enable rescue workers easier access to the occupant 452 of the vehicle 50. In another example, keeping the window 402' closed may be an appropriate impact mitigation reaction if the vehicle 50 has been submerged in water after a collision to prevent the occupant 452 from drowning.

The apparatus 100 may be configured to distinguish between objects interior to the vehicle 50 (e.g., the small child 452) and objects exterior to the vehicle 50 (e.g., a pedestrian outside the window 402'). For example, depth-sensing techniques may be implemented to determine which of the objects detected in the video frame 450 are inside the vehicle 50. In another example, the video frames from the interior of the vehicle 50 may be compared with video frames of the outside area of the vehicle 50 (e.g., one of the capture devices 102a-102n may capture a similar view outside of the vehicle 50 that may be seen through the window 402' from the video frame 450 captured by another one of the capture devices 102a-102n) to determine which objects are interior and which objects are exterior to the vehicle 50.

Figure 8:
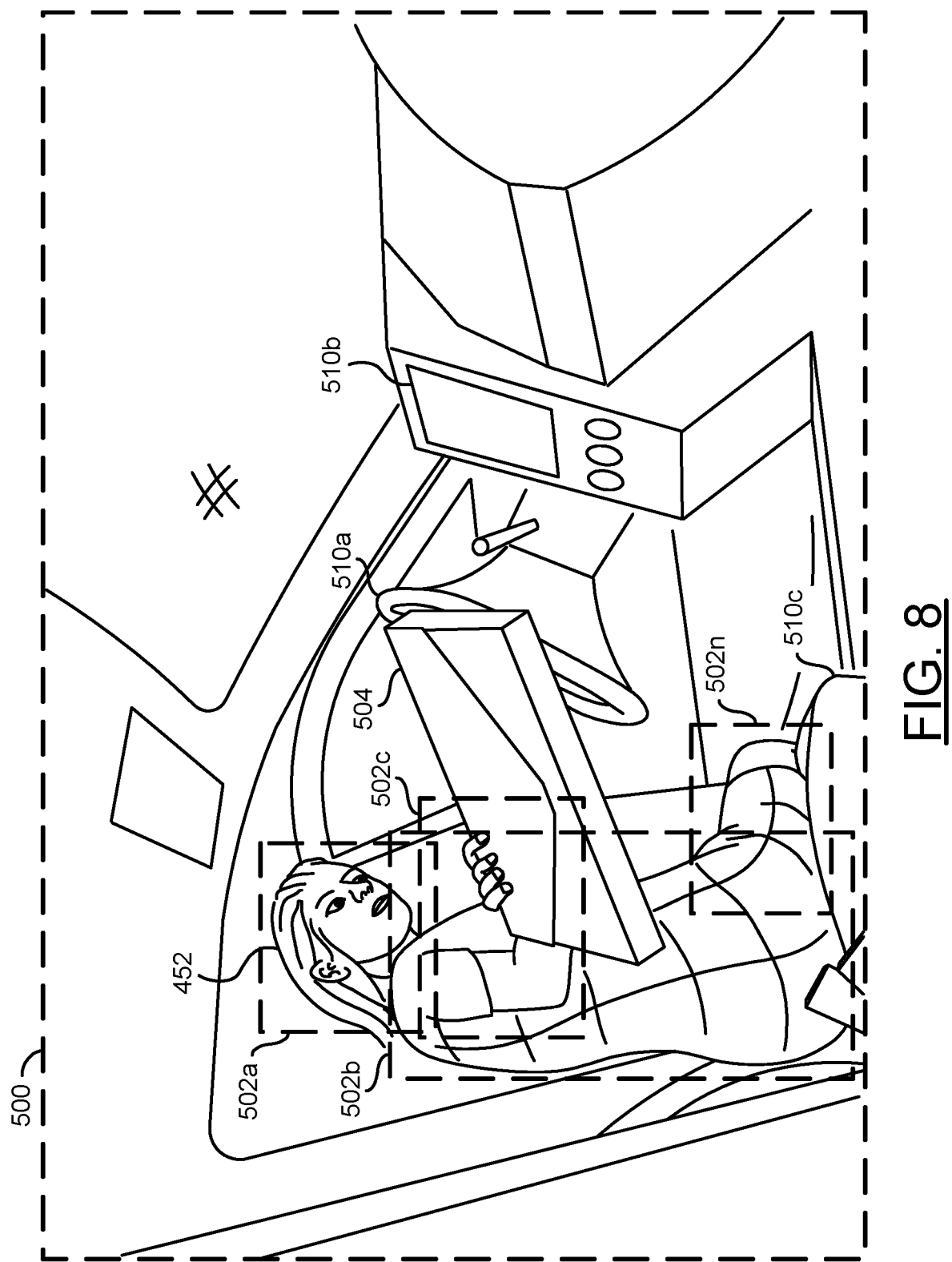
FIG. 8 is a diagram illustrating a processor detecting characteristics of a user entering a vehicle.

Referring to FIG. 8, a diagram illustrating the processors 106a-106n detecting characteristics of a user entering the vehicle 50 is shown. An example video frame 500 is shown. The example video frame 500 may be a video frame of the interior of the vehicle 50 captured by one of the capture devices 102a-102n. The example video frame 500 may be a video frame capturing a view of a user entering the vehicle 50.

The apparatus 100 may be configured to determine an identity of the user (e.g., the driver 452) of the vehicle 50. Each user of the vehicle 50 may have a limitation profile. The limitation profile may provide various rules and/or restrictions for the particular driver 452. For example, the limitation profile may apply to one driver without affecting another driver of the same vehicle. The rules and/or restrictions of the limitation profile may comprise conditions. The apparatus 100 may monitor for the conditions defined by the limitation profile. When the condition(s) are met, the apparatus 100 may initiate a reaction. For example, the condition may be met when there is an infraction of the rules. The rules provided by the limitation profile may define the reaction to be performed when the conditions are met.

The apparatus 100 may be configured to apply modifications to the limitation profile. For example, the driver 452 may have restrictions defined by the limitation profile and, under particular circumstances, the restrictions may be modified. When the particular circumstances are detected by the apparatus 100, the apparatus 100 may apply the modifications to the conditions and/or reactions defined by the limitation profile.

The limitation profile may be unique to a particular individual. For example, different people may have different conditions to monitor for and/or different reactions when the conditions are met. Since each limitation profile may apply to a particular individual, the apparatus may be configured to determine the characteristics of the users of the vehicle 50 in order to distinguish one user from another user. The computer vision operations may be used to determine the characteristics of the driver and the apparatus 100 may select the corresponding limitation profile in response to an identity of the detected user.

The example video frame 500 may be one of the video frames FRAMES_A-FRAMES_N captured using one of the capture devices 102a-102n of an interior view of the vehicle 50. In the example shown, the video frame 500 may provide a view of the interior and a partial view of an area exterior to the vehicle 50. In the example video frame 500, one occupant 452 is shown being analyzed using the computer vision operations implemented by the processors 106a-106n. However, the apparatus 100 may be further configured to detect numerous seats (e.g., not shown), seatbelts (e.g., seatbelts 304a-304n, not shown) and/or occupants (e.g., occupants 452a-452n, not shown) for the entire interior of the vehicle 50. While only one occupant, seat and/or seatbelt may be shown for illustrative purposes, aspects of the invention 100 may be similarly applicable and/or performed for each of the seats, seatbelts 304a-304n and/or occupants 452a-452n in the vehicle 50.

In the example shown, the occupant (or user) 452 may be in the process of entering the vehicle 50 through the driver side door (e.g., the user 452 has not yet sat down). In some embodiments, the processors 106a-106n may be configured to detect the characteristics of the user 452 determine limitations (or restrictions), compare with various conditions and/or generate a response for the user 452 before the user 452 has entered the vehicle 50 and/or sat down. For example, some of the conditions associated with a limitation profile may be detected before the user 452 has sat down and/or started driving. In an example, if the user 452 is not recognized, the user 452 may not be authorized to enter and/or start the vehicle 50. The reaction implemented may be to lock the doors of the vehicle 50 and/or prevent the vehicle 50 from starting.

In the example video frame 500, boxes 502a-502n are shown. The boxes 502a-502n may represent various objects detected by the processors 106a-106n. The various objects 502a-502n may correspond to various body parts analyzed. In the example shown, the object 502a may be a head and neck, the object 502b may be a torso and/or upper body, the object 502c may be an arm and/or the object 502n may be a leg. The body parts 502a-502n detected and/or the number of body parts 502a-502n analyzed may be varied according to the design criteria of a particular implementation.

The CNN module 150 may analyze the video frame 500 to determine the characteristics of the occupant 452. Boxes 502a-502n are shown in the video frame 500 to represent various body parts of the occupant 452 that may be identified using computer vision. However, the CNN module 150 may identify and/or analyze numerous other different body parts (e.g., not shown). The body parts identified may be varied according to the design criteria of a particular implementation.

Analysis of the body parts 502a-502n may be used by the processors 106a-106n to determine the characteristics of the occupant 452. In the example shown, the body parts 502a-502n may be used to determine a size, orientation, position and/or location of the occupant 452 (e.g., relative to the interior of the vehicle 50). In some embodiments, the computer vision operations may analyze individual body parts and/or the body as a whole (e.g., the condition may be if the user is not recognized and the reaction may be to prevent vehicle access).

For example, the processors 106a-106n may be configured to identify the body parts 502a-502n in the video frame 500 and measure a distance between the body parts 502a-502n. In an example, the distance between the body parts may be used to determine the characteristics of the occupant 452 to provide one potential source of information for determining a body size and/or characteristics of the occupant 452.

In one example, the measurements may be performed at a pixel level. For example, the age and/or body size of the occupant 452 may be determined by the processors 106a-

106*n* and may be based on the location and/or height of the occupant 452 relative to the components of the vehicle (e.g., a seat, the size of the driver side door, etc.). Numerous measurements (e.g., width of the body with respect to a seat, a distance from the head 502*a* to the headrest of the seat, a distance from the left shoulder to the top of the seat, etc.) may be performed by the processors 106*a*-106*n* to determine a body size and/or the characteristics of the occupant 452.

The head 502*a* of the occupant 452 is shown. The CNN module 150 may determine various characteristics of the head and/or face 502*a* of the occupant 452. The size and/or shape of the detected face 502*a* may be compared to the size and/or shape of other faces (e.g., adults and/or children) by the CNN module 150 to determine an identity of the occupant 452 and/or distinguish the occupant 452 from another occupant. Distances between and/or sizes of various facial features (e.g., eyes, nose, mouth, cheekbones, jaw, chin, eyebrows, forehead, ears, etc.) may be analyzed by the processors 106*a*-106*n* and/or compared with statistical data about facial features to identify the occupant 452 as a particular person and/or to store new facial features for a new (e.g., previously unidentified) person. The analysis and/or comparisons performed by the processors 106*a*-106*n* may be used to identify the occupant 452 based on the computer vision operations. The types of analysis performed, the facial features analyzed, the comparisons made and/or the statistical information used for comparison may be varied according to the design criteria of a particular implementation.

In some embodiments, the overall size of the head 502*a* may be used to determine the size of the occupant 452. In an example, the size of the head 502*a* may be compared to the overall size of the body of the occupant 452. The proportion of various body parts may be used to determine the characteristics of the occupant 452. The processors 106*a*-106*n* may be configured to use the detected size of the head 502*a* as one factor for determining the characteristics of the occupant 452.

In some embodiments, the characteristics of the occupant 452 may comprise an identity of the user. For example, the characteristics of the occupant 452 may be the identity of the user determined using facial recognition. The processors 106*a*-106*n* may associate the identity of the user with a particular (e.g., specific or unique) limitation profile. In some embodiments, the characteristics of the occupant 452 may comprise the size, shape and/or proportions of the various body parts 502*a*-502*n*. For example, the characteristics of the occupant 452 may be an array of data indicating a body type of the user. The processors 106*a*-106*n* may associate the body type of the user with the limitation profile. The type of characteristics (e.g., the identity using facial recognition and/or body type based on measurements of the body parts) used by the processors 106*a*-106*n* may be varied according to the design criteria of a particular implementation.

In some embodiments, the processors 106*a*-106*n* may determine details of the characteristics of the occupant 452. For example, the characteristics may comprise the detection of facial hair, detecting breast size, detecting an enlarged Adam's apple, detecting a size and/or shape of a nose, determining a hip width, determining a leg length, detecting types and/or styles of clothing worn, detecting accessories worn (e.g., jewelry, watches, piercings, tattoos, etc.), detecting scars, detecting eye color, detecting skin color, detecting hair style, detecting hair length, detecting hair color, etc. In another example, the computer vision operations may detect temporary conditions that may affect a limitation profile of the occupant 452 (e.g., a baby bump indicating that the occupant 452 is pregnant). In yet another example, the computer vision operations may detect permanent changes that may affect the limitation profile of the occupant 452 (e.g., when the occupant 452 reaches a certain age, some restrictions may be lifted). The type of details analyzed and/or considered in order to determine the characteristics of the occupant 452 and/or the changes made to the limitation profile may be varied according to the design criteria of a particular implementation.

The processors 106*a*-106*n* may determine the characteristics of the occupant 452 based on an aggregation of various features detected using the computer vision operations performed by the CNN module 150. Statistical weight may be adjusted for various characteristics. For example, a higher confidence level of an accurate detection of particular characteristic may have more statistical weight than a lower confidence level of accurate detection. In another example, particular characteristics may have a higher statistical weight (e.g., to account for particular factors that may provide a better indication of identity and/or body type such as the facial recognition). The various factors and/or the statistical weights applied by the processors 106*a*-106*n* for each type of factor used for determining the age of the occupant 452 may be varied according to the design criteria of a particular implementation.

The body parts 502*a*-502*n* of the example video frame 500 are shown as representative examples. Different body parts may have greater granularity of detection and/or analysis. For example, the arm 502*c* is shown. However, in some embodiments, the arm 502*c* may be detected as many different body parts (e.g., the forearm, the upper arm, the wrist, the hand, the fingers, etc.).

In some embodiments, the body parts 502*a*-502*n* may be used to identify the user 452 as a particular individual. In one example, the face 502*a* may be detected and/or analyzed for facial recognition based limitation profiles. In some embodiments, the body parts 502*a*-502*n* may be analyzed to determine body size, limb size, limp shape, body type, body part size, body part shape and/or body proportions.

In the example video frame 500, an object 504 (e.g., an inanimate object) is shown. The processors 106*a*-106*n* may be configured to detect the object 504 and/or determine characteristics (e.g., size, approximate weight, etc.) of the object 504. In the example shown, the user 452 may be placing the object 504 on the passenger side seat. In some embodiments, the object 504 may be one of the conditions of the limitation profile. For example, for a teenager driving, one of the conditions may be that the teenager may not have a smartphone while driving (e.g., to prevent distractions). If the object 504 is a smartphone, then one of the conditions of the limitation profile may be met and one of the reactions may be selected by the decision module 158 (e.g., the vehicle 50 may be prevented from starting).

Vehicle components 510*a*-510*c* are shown in the example video frame 500. The vehicle components 510*a*-510*c* shown in the video frame 500 may be representative examples of various vehicle components that may be controlled and/or adjusted by the reaction selected by the decision module 158. In one example, the actuators 116 may control and/or adjust the vehicle components 510*a*-510*c* in response to the reaction selected by the decision module 158 (e.g., the signal VCTRL'). In one example, the settings of the limitation profile for the user 452 may be realized by adjusting the vehicle components 510*a*-510*c* and/or other vehicle components. The number, type and/or available configurations of the vehicle components may be varied according to the design criteria of a particular implementation.

In the example shown, the vehicle component 510a may be the steering wheel, the vehicle component 510b may be the infotainment system and the vehicle component 510c may be a seat. The reaction selected by the decision module 158 in response to the selected limitation profile may adjust the settings of the vehicle components 510a-510c if one or more of the conditions defined in the selected limitation profile are met. In one example, one of the reactions may be that the steering wheel 510a may be locked (e.g., prevented from being turned) to prevent the user 452 from driving. In another example, the infotainment system 510b may be adjusted (e.g., temperature settings, fan settings, preferred radio station, start playback of audio file at position where the file was previously stopped, stored navigation settings, etc.) to match the various conditions of the infotainment system 510b in the limitation profile for the user 452. In yet another example, the volume of the infotainment system 510b may be restricted to prevent a driver from listening to music at a distracting volume.

When the apparatus 100 implements facial recognition and/or the identity of the user 452 is determined to match a specific (e.g., individual) limitation profile, the various vehicle components (e.g., the vehicle components 510a-510c) may be adjusted in response to a condition of the limitation profile being met (e.g., an infraction). In some embodiments, the limitation profile of the user 452 may have multiple conditions and/or reactions associated with different factors. In one example, one set of conditions and/or reactions may apply when the user 452 is alone. In another example another set of conditions and/or reactions may apply when the user 452 has one or more passengers in the vehicle 50. The number of available conditions and/or reactions in each limitation profile may be varied according to the design criteria of a particular implementation.

The processors 106a-106n may be configured to generate a reaction in response to one or more conditions of the limitation profile for the occupant 452 being met. The processors 106a-106n may generate the signal VCTRL to generate the reaction. The decision module 158 may select an appropriate reaction in response to the characteristics of the occupant 452 (e.g., the identity of the occupant 452) determined as a result of the computer vision operations. The appropriate reaction may correspond to the conditions in the limitation profile. For example, the limitation profile for the occupant 452 may comprise a number of pre-set conditions. The processors 106a-106n may be configured to detect the current conditions (e.g., a speed of travel, a location of the vehicle 50, use of the infotainment system 510b, etc.) and the signal VCTRL may be configured to provide a warning, log that the condition has been met, send a notification and/or adjust the various vehicle characteristics (or components) if the condition of the vehicle 50 meets the restricted conditions of the limitation profile. The number and/or types of reactions available for selection may be varied based on the design criteria of a particular implementation.

Figure 9:
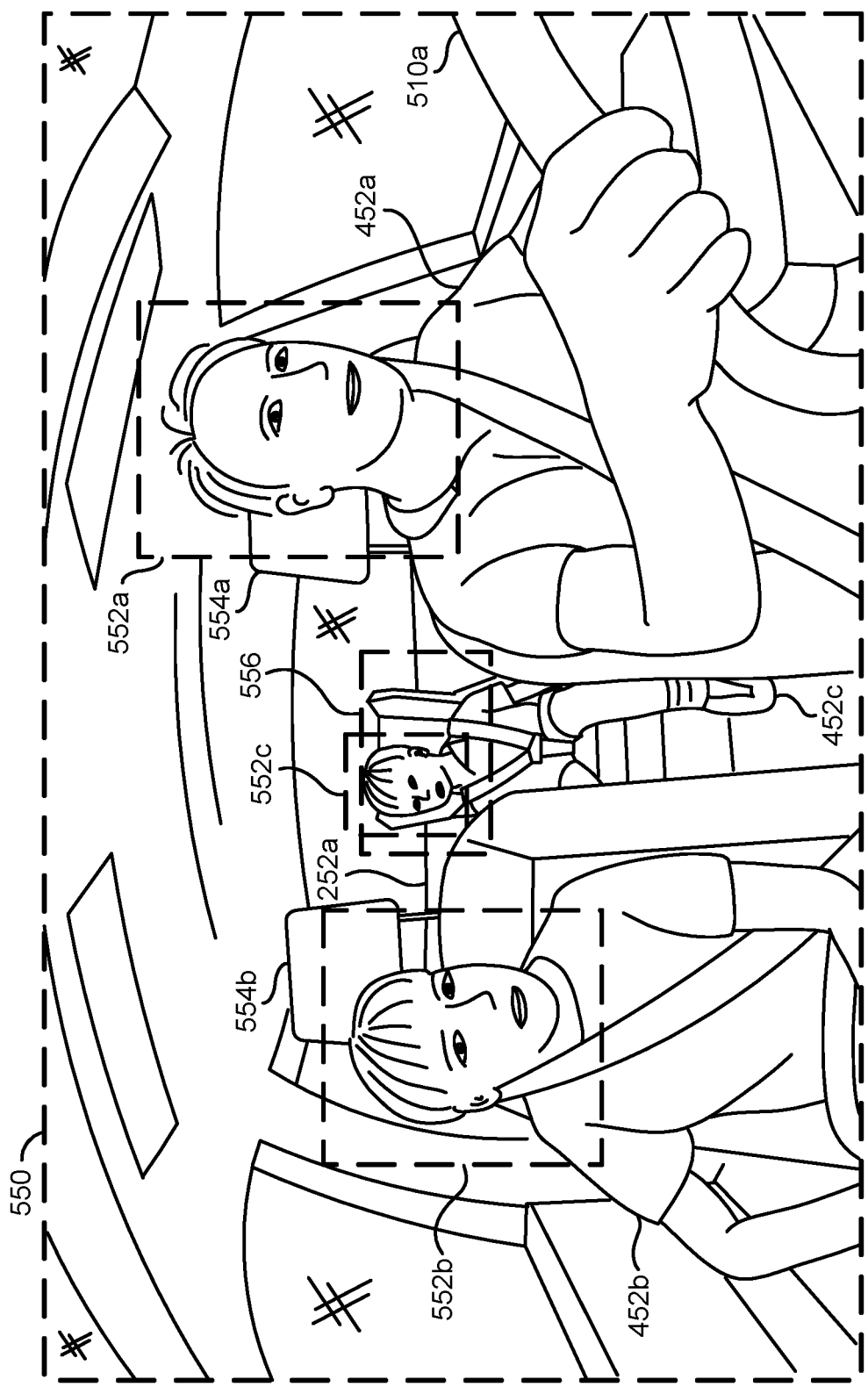
FIG. 9 is a diagram illustrating a processor analyzing characteristics of passengers in a vehicle cabin.

Referring to FIG. 9, a diagram illustrating the processors 106a-106n analyzing characteristics of passengers in a vehicle cabin is shown. A video frame 550 is shown. The video frame 550 may be a video frame captured by one or more of the capture devices 102a-102n of the interior of the vehicle 50. In one example, the lens 112a of the capture device 102a may implement a wide angle lens configured to capture a wide angle field of view of the interior of the vehicle 50. For example, the processors 106a-106n may be configured to perform video de-warping operations on potential distortions caused by the wide angle lens 112a before performing the computer vision operations.

In another example, the video frame 550 may be created by stitching together video frames captured at the same time by more than one of the capture devices 102a-102n. For example, the processors 106a-106n may be configured to perform video stitching operations to combine multiple video frames together in order to generate the video frame 550 before performing the computer vision operations. Capturing a wide angle view and/or generating a stitched view of the interior of the vehicle 50 may enable the processors 106a-106n to analyze a view showing more than one of the occupants 452a-452n of the vehicle 50. The method of capturing the wide angle video frame 550 may be varied according to the design criteria of a particular implementation.

In the example video frame 550, boxes 552a-552c are shown. The boxes 552a-552c may be a detected object and/or group of objects representing faces and/or heads detected by the processors 106a-106n. For example, the face object 552a may correspond to the occupant 452a, the face object 552b may correspond to the occupant 452b and the face object 552c may correspond to the occupant 452c. A number of occupants 452a-452c are shown. For example, the driver 452a is shown in a driver seat 554a, the passenger 452b is shown in a passenger seat 554b and the occupant 452c is shown in a seat in the back row 252a (e.g., a bench seat). A box 556 is shown. The box 556 may correspond to a child safety seat detected by the processors 106a-106n. The CNN module 150 may be configured to detect various objects in the video frame 550. In an example, the computer vision operations may detect the steering wheel 510a (or other features of the interior of the vehicle 50). In another example, the computer vision operations may detect the driver seat 554a, the passenger seat 554b and/or the back row bench seat 252a.

The processors 106a-106n may be configured to detect whether the driver 452a is present. In one example, the driver 452a may be detected based on a location of the driver seat 554a. For example, the memory 108 may store the location of each seat of the vehicle 50. In another example, the driver 452a may be detected based on the location of the steering wheel 510a. For example, the occupant 452a may be detected as the driver since the occupant 452a has been detected sitting in front of the steering wheel 510a. In yet another example, fleet learning may be implemented to determine where the driver sits in various types of vehicles.

The processors 106a-106n may be configured to determine the age and/or identity of the occupants 452a-452c based on the faces 552a-552c (e.g., facial features) and/or other characteristics of the occupants 452a-452c determined by the CNN module 150 (e.g., a body size, body proportions, etc.). The processors 106a-106n may be configured to determine a location of the seats 554a-554b and/or the bench seat 252a. The processors 106a-106n may be configured to determine the location of the occupants 452a-452c within the cabin of the vehicle 50. In one example, 3D co-ordinates of the body of the occupants 452a-452c may be determined (e.g., by determining a horizontal co-ordinate, a vertical co-ordinate and/or a depth co-ordinate for each occupant 452a-452n with respect to the lens 112a of the capture device 102a).

In another example, various objects within the vehicle 50 may be used to provide a location of the occupants 452a-452c (e.g., a location of the seats 554a-554b and/or the bench 252a, a location of the steering wheel 510a, distance from the windows and/or side panels, etc.). In yet another example, the sensor fusion module 152 may be configured to analyze input from the vehicle sensors 114 to perform sensor fusion operations (e.g., cross-reference a location determined based on the computer vision operations with weight sensors located in the seats 554a-554b and/or the bench 252a, perform a comparison based on LIDAR, perform a comparison based on radar detection, etc.). Based on the characteristics of the occupants 452a-452c, the locations of the occupants 452a-452c and/or the locations of the seats 554a-554b and/or the bench 252a, the processors 106a-106n may determine whether a reaction should be performed.

In the example video frame 550, the occupant 452a may be an adult driver. The computer vision operations may determine that the face 552a has characteristics corresponding to an adult male (e.g., adult facial features). The computer vision operations may further determine that the body of the occupant 452a is the body of an adult male (e.g., the body is tall relative to the seat 554a, the head 552a reaches the headrest of the seat 554a, the arms are not reaching up to touch the steering wheel 510a, the size of the head 510a is small in proportion to the body, etc.).

The computer vision operations may further determine the identity of the occupant 452a. The processors 106a-106n may perform the computer vision operations to detect the location of the seat 554a (e.g., detect the driver seat in the front row). In some embodiments, the locations of the seats may be pre-defined information stored in the memory 108 (e.g., based on location co-ordinates relative to the location of the capture device 102a). The processors 106a-106n may determine the identity of the user 452a and that the user 452a is in the driver seat 554a.

In the example video frame 550, the occupant 452b may be a child passenger. The computer vision operations may determine that the face 552b has characteristics corresponding to a child (e.g., pre-teen facial features). The computer vision operations may further determine that the body of the occupant 452b is the body of a young male below the age of 12 (e.g., the body is small relative to the seat 554b, the head 552b does not reach the headrest of the seat 554b, the size of the head 552b is large in proportion to the body, etc.). The processors 106a-106n may perform the computer vision operations to detect the location of the seat 554b (e.g., detect the passenger seat in the front row).

For occupants that are not in the driver seat 554a, the identity of the occupant may not be needed to determine the conditions, limitations and/or modifiers. For example, the driver 452a may have one set of conditions if the driver 452a is driving alone and a modified set of conditions when driving with a passenger (e.g., regardless of the identity of the passengers). In some embodiments, the driver 452a may have a modified set of conditions when driving with a specific passenger (e.g., the modified conditions to apply depend on determining the identity of the passenger 452b). In some embodiments, the driver 452a may have a modified set of conditions when driving with a passenger of a particular type (e.g., one set of modified conditions with an adult passenger and another set of modified conditions with a child passenger).

In the example video frame 550, the occupant 452c may be a toddler. The computer vision operations may determine that the face 552c has characteristics corresponding to a toddler and/or a baby (e.g., very young facial features). The computer vision operations may further determine that the body of the occupant 452c is the body of an infant male below the age of 6 (e.g., the body is small relative to the seat 252a, the size of the head 552c is very large in proportion to the body, the feet of the occupant 452c do not reach the floor, etc.). The processors 106a-106n may perform the computer vision operations to detect the location of the seat 252a (e.g., detect the seat as a bench for the back row 252a). In an example, the identity of the passenger 452c may not be needed to determine whether modified conditions may be applied for the driver 452a. For example, the driver 452a may have a set of modified conditions if a toddler is detected in the vehicle 50.

In one example, one of the conditions may be that with the toddler 452c in the vehicle 50, the driver 452a may not start the vehicle 50 unless the toddler 452c is secured in the child safety seat 556. The computer vision operations may be used to determine whether the toddler 452c is secured in the child safety seat 556. Various criteria for the child safety seat 556 may be checked (e.g., size, orientation, whether the restraints are connected, etc.). For example, for a baby, the correct orientation for the safety seat 556 may be backwards (e.g., not facing the front of the vehicle 50). Since the occupant 452c is not a baby, a front facing child safety seat 556 may meet the threshold criteria. When the child safety seat 556 is determined to be installed correctly, the decision module 158 may determine that the reaction (or restriction) of preventing the vehicle 50 from starting may be stopped and/or disabled.

The processors 106a-106n may be configured to determine the approximate age of the occupants 452a-452n and/or an associated confidence level indicating the determination of the age. The processors 106a-106n may be configured to determine the identity of the occupants 452a-452n and/or an associated confidence level indicating the determination of the identity. The confidence level may represent a likelihood that the determination (of age and/or identity) is correct.

In some scenarios, the identity of the occupants 452a-452c may be difficult to determine and/or the age of the occupants 452a-452c (or other modifier criteria) may be difficult to determine or may be close to the threshold for the particular modifier criteria. For example, the child 452b may appear to be approximately 12 years old (e.g., right at the threshold age) and the driver 452a may not have a modifier for a passenger over the age of 12 years old. When the modifier is difficult to determine, the processors 106a-106n may perform reversible and/or easily correctable reactions. For example, performing the notification on the infotainment touchscreen display 510b may be non-intrusive, and may provide useful information in the case that the passenger 452b is younger than 12 and may be easily ignored if the passenger 452b is older than 12.

Figure 10:
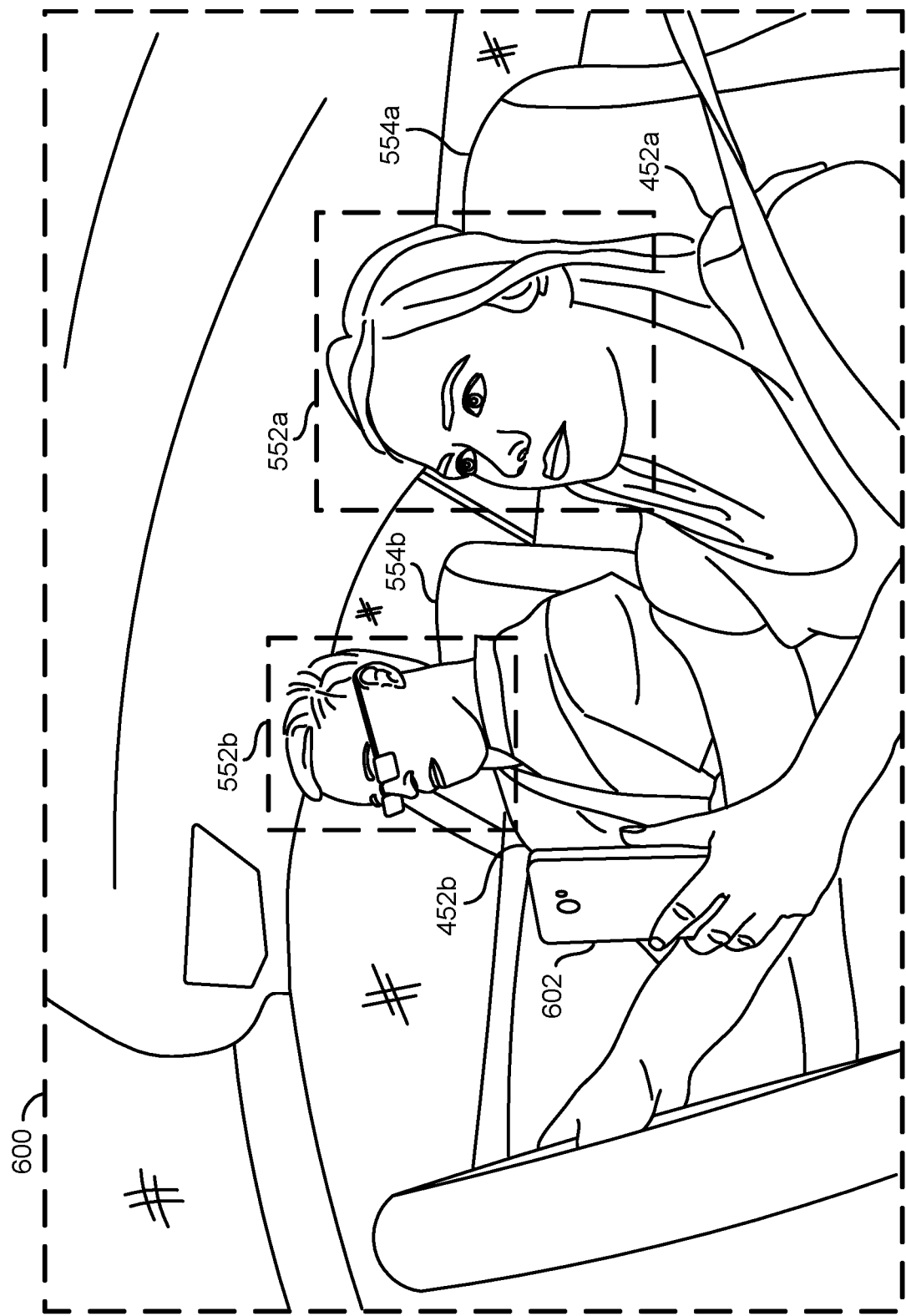
FIG. 10 is a diagram illustrating a processor detecting a young driver and an adult passenger.

Referring to FIG. 10, a diagram illustrating the processors 106a-106n detecting a young driver and an adult passenger is shown. An example video frame 600 is shown. The example video frame 600 may be a video frame of the interior of the vehicle 50 captured by one of the capture devices 102a-102n. The example video frame 600 may be a video frame capturing a front row of seats of the interior of the vehicle 50.

Occupants 452a-452b are shown in the video frame 600. The seats 554a-554b are shown in the video frame 600. The occupant 452a may be in the driver seat 554a. The occupant 452b may be in the passenger seat 554b.

The faces 552a-552b detected by the processors 106a-106n are shown. The face 552a may be the face of the driver 452a. The face 552b may be the face of the passenger 452b. The processors 106a-106n may further detect the seats 554a-554b. The processors 106a-106n may detect that the face 552a corresponds to the occupant 452a located in the driver seat 554a. The processors 106a-106n may detect that the face 552b corresponds to the occupant 452b located in the passenger seat 554b.

The processors 106a-106n may be configured to determine the characteristics of the occupants 452a-452b for a particular one of the seats 554a-554b. The characteristics may be used to determine the identity of the occupants 452a-452b. The decision module 158 may determine the identity of the driver 452a. The processors 106a-106n may select the limitation profile corresponding to the identity of the driver 452a (e.g., stored in the memory 108). The processors 106a-106n may be configured to determine the identity of the passenger 452b and/or determine characteristics of the passenger 452b. For example, the characteristics of the passenger 452b may be analyzed by the CNN module 150 and the decision module 158 may determine that the passenger 452b is an adult male. In another example, the face 552b of the passenger 452b may be analyzed by the CNN module 150 and the decision module 158 may identify the passenger 452b as a person that is a driving instructor. The presence of the passenger 452b (e.g., an adult) may be a modifier in the limitation profile of the driver 452a (e.g., a teenager).

The characteristics of the occupants 452a-452b may be determined at varying levels of granularity, according to the design criteria of a particular implementation. To load the limitation profile for the driver 452a, the processors 106a-106n may determine the identity of the driver 452a (e.g., a high level of granularity to recognize a person as a specific person). Since the presence of the occupant 452b may be a modifier for the driver 452a, the processors 106a-106n may determine the characteristics of the passenger 452b with varying levels of granularity. In one example, the passenger 452b may be determined to be a male that is over the age of 25 (e.g., a low level of granularity). In another example, the passenger 452b may be determined to be the parent of the driver 452a (e.g., a high level of granularity).

Generally, the level of granularity used for the determination of the characteristics of the occupant 452b may be based on the various modifiers for the limitation profile of the driver 452a. In one example, the driver 452a may not have a modifier for a passenger and the processors 106a-106n may conserve resources by not performing computer vision operations on the passenger 452b. In another example, the driver 452a may have a modifier for a passenger over a particular age (e.g., older than 25 years old) and the processors 106a-106n may perform the computer vision operations on the passenger 452b with a low level of granularity to determine an age of the passenger 452b. In yet another example, the driver 452b may have a modifier for a particular passenger (e.g., a parent) and the processors 106a-106n may perform the computer vision operations with a high level of granularity to determine the identity of the passenger 452b.

The decision module 158 may determine a reaction according to the limitation profile selected for the occupant 452a. The reaction selected may be determined based on the conditions detected. The conditions may be modified by the modifier. In one example, if the driver 452a is alone, the conditions of the limitation profile may provide a restriction from driving on freeways (e.g., a geolocation condition). The reactions may be selected to prevent the driver 452a from driving on the freeway. In another example, if the driver 452a is with a driving instructor (e.g., the passenger 452b) the geolocation condition may be modified to allow the driver 452a to drive on the freeways. With the passenger 452b, the reaction may be modified to not prevent the driver 452a from driving on the freeways (e.g., the reaction for the geolocation condition may be modified to a null reaction).

In some embodiments, the processors 106a-106n may implement graduated (e.g., escalating) and/or dependent reactions. For example, if the driver 452a is determined to be driving above a high speed condition (e.g., faster than 65 mph), the reaction to the infraction of the condition selected by the processors 106a-106n may be to provide a prompt on the infotainment system touchscreen display 510b that provides a warning message to slow down. If the driver slows down (e.g., to a speed below the high speed condition), the notification may be turned off and/or no additional reaction may be performed. If the driver continues to drive at a speed above the high speed condition (e.g., the infraction has not been remedied), then a different reaction may be performed. For example, a notification may be sent to a parent. If the driver continues to drive at a speed above the high speed condition, then a next reaction may be performed. For example, the signal VCTRL may be generated to use the actuators 116 to autonomously slow down the vehicle 50.

In the example video frame 600, the driver 452a is shown holding a smartphone 602. The computer vision operations implemented by the CNN module 150 may be configured to detect the smartphone 602. In an example, one of the conditions of the limitation profile may be that the driver 452a may not hold the smartphone 602. If the smartphone 602 is detected, the reaction may be initiated by the processors 106a-106n. For example, the reaction selected by the decision module 158 may be to pull the vehicle 50 over to the side of the road until the driver 452a puts down the smartphone 602.

Figure 11:
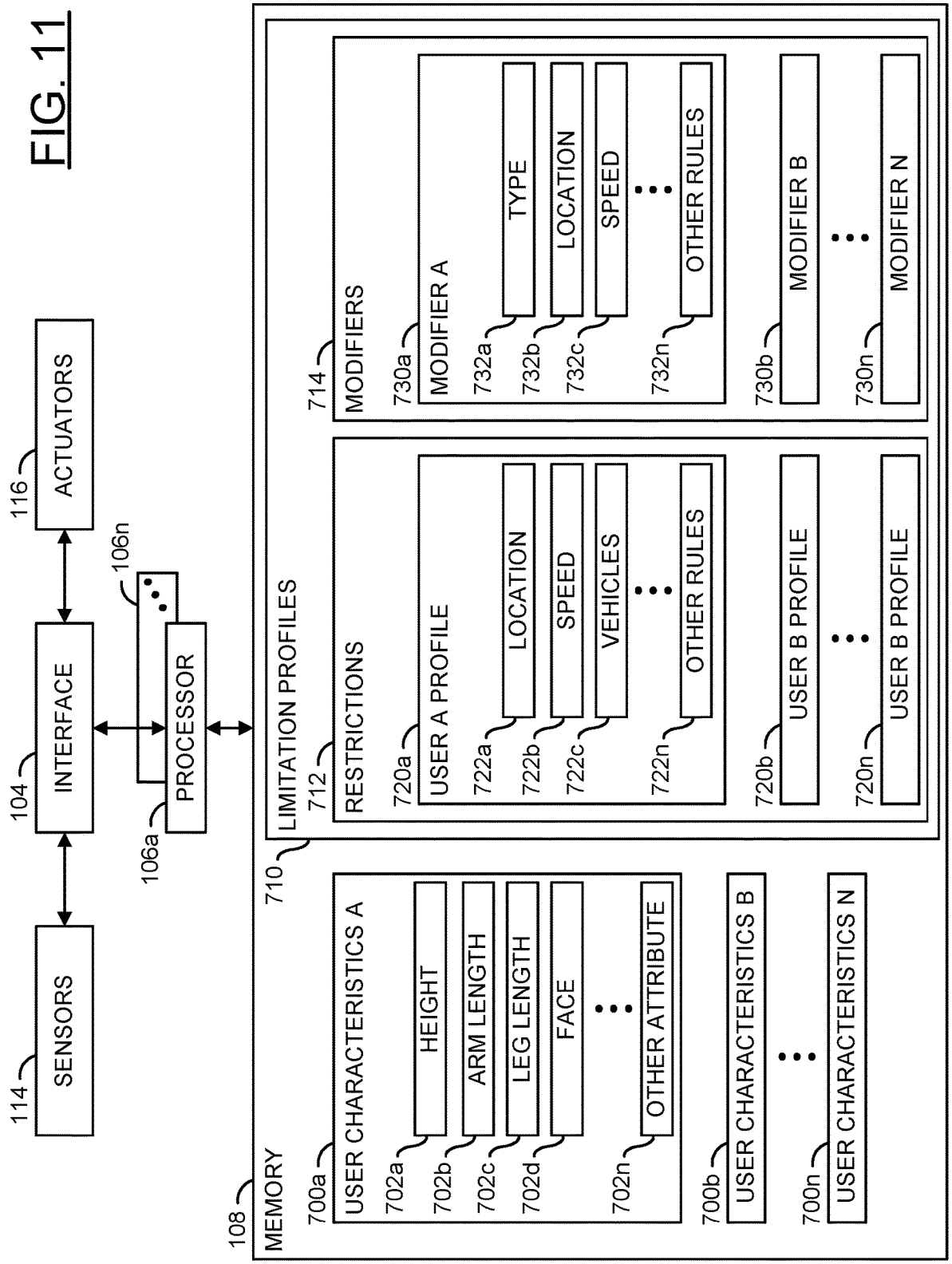
FIG. 11 is a diagram illustrating occupant profiles and limitation profiles.

Referring to FIG. 11, a diagram illustrating occupant profiles and limitation profiles is shown. The interface 104, the processors 106a-106n, the memory 108, the sensors 114 and/or the actuators 116 are shown.

The memory 108 is shown comprising blocks (or circuits) 700a-700n, blocks (or circuits) 702a-702n, a block (or circuit) 710, a block (or circuit) 712, a block (or circuit) 714, blocks (or circuits) 720a-720n, blocks (or circuits) 722a-722n, blocks (or circuits) 730a-730n and/or blocks (or circuits) 732a-732n. The blocks 700a-700n may represent various user characteristic sets. The blocks 702a-702n may comprise the characteristics. The block 710 may comprise the limitation profiles. The block 712 may comprise the individual limitation profiles (e.g., restrictions). The block 714 may comprise the modifier profiles. The blocks 720a-720n may comprise the individual limitation profiles. The blocks 722a-722n may comprise the limitation profile settings. The blocks 730a-730n may comprise the individual modifier profiles. The blocks 732a-732n may comprise the modifier conditions. The memory 108 may comprise other components (not shown). The number, type and/or arrangement of the memory 108 may be varied according to the design criteria of a particular implementation.

Each of the user characteristic sets 700a-700n may be configured to store the characteristics 702a-702n for each occupant 452a-452n of the vehicle 50. For clarity, the characteristics 702a-702n are shown for the user characteristic set 700a, however each of the user characteristic sets 700b-700n may similarly comprise the characteristics 702a-702n. The user characteristic sets 700a-700n may be used to distinguish various individuals (e.g., known and/or recognized individuals). For example, one of the user characteristic sets (e.g., 700a) may correspond to the vehicle owner (e.g., a person who commonly uses the vehicle 50).

Generally, a guest in the vehicle 50 may not already have one of the user characteristic sets 700a-700n (e.g., the guest occupant may not be recognized yet). As new occupants enter the vehicle, new user characteristic sets 700a-700n may be generated by the processors 106a-106n as the characteristics 702a-702n are learned and associated with a particular individual. Generally, the user characteristic sets 700a-700n are independent from the seats 554a-554n since the user characteristic sets 700a-700n comprise physical information about the occupants 452a-452n detected by the processors 106a-106n using computer vision operations. The user characteristic sets 700a-700n may be stored for particular individuals long term (e.g., even after the occupant is no longer in the vehicle 50) to enable the apparatus 100 to recognize the occupants 452a-452n and set the limitation profiles as they enter the vehicle 50.

The characteristics 702a-702n may be a data set of the various types of physical information learned about a particular individual by the processors 106a-106n. In the example shown, the characteristic 702a may be a total height of the occupant, the characteristic 702b may be an arm length of the occupant, the characteristic 702c may be a leg length of the occupant, the characteristic 702d may be the face of the occupant. For example, the face 702d may comprise facial features. The facial features may be determined based on facial recognition. The face 702d may be a face recognition profile used to identify the occupant as a particular individual (e.g., the car owner) by comparing detected facial features (e.g., the faces 510a-510n) with the stored face recognition profile 702d. In an example, the characteristics 702a-702n may correspond to the body parts 502a-502n analyzed by the processors 106a-106n shown in association with FIG. 8. The number and/or type of characteristics 702a-702n associated with each occupant may be varied according to the design criteria of a particular implementation.

The limitation profiles 710 may comprise the individual limitation profiles 712 and the modifiers 714. The reactions performed in response to the limitation profiles 710 may be performed by the actuators 116 of the vehicle 50. For example, the sensors 114 may be configured to determine the current configuration of the vehicle components 510a-510n and/or the vehicle 50 (e.g., speed, location, acceleration, music volume, etc.). The processors 106a-106n may request the limitation profiles 710 from the memory 108. The memory 108 may provide the limitation profiles 710. The processors 106a-106n may compare the current configuration of the vehicle components 510a-510n and/or the vehicle 50 with the conditions of the limitation profiles 710. The processors 106a-106n may initiate a response corresponding to the limitation profiles 710 by sending instructions (e.g., the signal VCTRL) to the actuators 116 to adjust the components 510a-510n to perform the reactions defined by the limitation profiles 710.

The limitation profiles 712 (e.g., individual restrictions) may comprise various conditions and/or reactions to perform in response to the conditions being detected. The individual restrictions 712 may comprise the individual limitation profiles 720a-720n. For example, each of the individual limitation profiles 720a-720n may be potentially unique to a particular person (e.g., as identified using the face data 702d in the user characteristic sets 700a-700n). For example, the individual limitation profile 720a may correspond to the vehicle owner. For example, the occupant 452a may enter the vehicle 50 and the processors 106a-106n may match the detected face 552a to the stored face 702d of the user 700a and load the individual limitation profile 720a. Generally, the individual limitation profiles 720a-720n are selected when one of the occupants 452a-452n is identified as a specific person.

Each of the individual limitation profiles 720a-720n may be configured to store rules (e.g., conditions associated with reactions) 722a-722n. For clarity, the rules 722a-722n are shown for the individual limitation profile 720a, however each of the individual limitation profiles 720b-720n may similarly comprise a set of the rules 722a-722n.

The rules 722a-722n may comprise a number of conditions and/or a number of reactions. For example, each condition may correspond to a reaction. In one example, the rules 722a-722n may comprise an if-then relationship between a condition and a reaction. The rules 722a-722n may have different values (e.g., condition and/or reactions) for each of the individual limitation profiles 720a-720n. In some embodiments, the rules 722a-722n may comprise numerical values, Boolean values, a range of values, etc.

The rules 722a-722n may be loaded by the processors 106a-106n. The rules 722a-722n may correspond to a configuration of the vehicle components 510a-510n. The rules 722a-722n may correspond to characteristics of the vehicle 50 (e.g., speed, acceleration, location, etc.). The rules 722a-722n may correspond to the environment of the vehicle 50 (e.g., level of light, amount of rain, amount of snow, etc.). The current conditions of the vehicle 50 may be detected by the sensors 114. The current conditions of the vehicle 50 may be detected by the capture devices 102a-102n (e.g., an exterior camera may detect an amount of snow on the ground using computer vision operations). The processors 106a-106n may compare the current conditions with the conditions provided by the rules 722a-722n of the selected one of the individual limitation profiles 720a-720n. If the current conditions meet the conditions provided by the rules 722a-722n (e.g., an infraction is detected), then the processors 106a-106n may perform the reaction provided by the rules 722a-722n that corresponds to the condition that has been met. For example, the reactions initiated by the processors 106a-106n may adjust the current configuration of the vehicle components 510a-510n determined by the sensors 114 to match the reactions provided by the rules 722a-722n.

In the example shown, the rule 722a may be a vehicle location rule (e.g., a geolocation restriction), the rule 722b may be a speed rule (e.g., a speed limit) and the rule 722c may be a vehicle rule. For example, if a family has multiple vehicles, a family member may not be allowed to use a particular one of the vehicles. The rules 722a-722n may correspond to various types of rules. For example, the conditions may comprise a time of day (e.g., a teenager may have a curfew), an acceleration restriction (e.g., to prevent racing), vehicle occupancy restrictions (e.g., to limit the amount of friends allowed in the vehicle 50), days of the week (e.g., the driver 452a may only be allowed to use the vehicle 50 to drive to and from work on weekdays), weather conditions and/or infotainment center settings (e.g., parental restrictions on content that may be played using the infotainment center). The number, type, restrictions, conditions, infractions and/or reactions for the rules 722a-722n may be varied according to the design criteria of a particular implementation.

In some embodiments, the individual limitation profiles 720a-720n may be selected by the processors 106a-106n based on supplemental information received from a user device. For example, the user device may be the smartphone 602, a smart watch and/or some other portable device configured to perform wireless communication. For example, the smartphone 602 may wirelessly pair with the vehicle 50 to provide information to the processors 106a-106n. The supplemental information may comprise an identity (e.g., an email address, a social network profile, a profile stored by a vehicle provider, etc.). The identity from the user device may be used to supplement the characteristics 702a-702n used to determine the unique identity of the occupants 452a-452n (e.g., increase a confidence level of the detection). In another example, facial recognition and/or data from a face previously identified by the smartphone 602 may be presented to the processors 106a-106n to compare with the stored face 702d.

The modifiers 714 may corresponds to one or more of the individual limitation profiles 720a-720n. The modifiers 714 may represent an additional factor that may change (e.g., over-ride) the conditions and/or reactions of the rules 722a-722n. The modifiers 714 may provide temporary changes to the individual limitation profiles 720a-720n. The temporary change from the modifiers 714 may be reverted when the modifiers 714 are no longer applied. The modifiers 714 may comprise a number of individual modifiers 730a-730n.

The individual modifiers 730a-730n may each correspond to a factor. Each of the individual modifiers 730a-730n may be configured to store the modifier conditions 732a-732n. For clarity, the modifier conditions 732a-732n are shown for the individual modifier 730a, however each of the individual modifiers 730b-730n may similarly comprise the modifier conditions 732a-732n. The modifier conditions 732a-732n may have some similarities to the rules 722a-722n. For example, the modifier conditions 732a-732n may be configured to adjust (e.g., modify) the rules 722a-722n.

The modifier condition 732a may be a type of modifier. The modifier condition 732a may correspond to some other type of factor that may initiate the application of the particular one of the individual modifiers 730a-730n. In one example, the modifier condition 732a may be a passenger in the vehicle 50. In another example, the modifier condition 732a may be a particular individual detected in the vehicle 50 (e.g., identified according to the user characteristic sets 700a-700n, such as a parent). In yet another example, the modifier condition 732a may be a time of day and/or weather condition (e.g., different conditions may be applied at night time). The type of modifier condition 732a that may be the factor for applying the individual modifiers 730a-730n may be varied according to the design criteria of a particular implementation.

In the example shown, the modifier condition 732b may be a location (e.g., a geolocation restriction) and the modifier condition 732c may be a speed rule. For example, the modifier condition 732b may correspond to the rule 722a (e.g., geolocation restrictions) and the modifier condition 732c may correspond to the rule 722b (e.g., speed restrictions). In some embodiments, the modifier conditions 732b-732n may provide an adjustment to the rules 722a-722n of the individual limitation profiles 720a-720n. In some embodiments, the modifier conditions 732b-732n may provide additional rules and/or restrictions to the limitation profiles 720a-720n.

The modifier conditions 732a-732n may similar to the rules 722a-722n. For example, the modifier conditions 732a-732n may comprise a condition and a reaction. The modifier condition 732a may be a special case rule (e.g., the condition for the modifier condition 732a may be detecting the factor and the reaction for the modifier condition 732a may be for the processors 106a-106n to apply the other modifier conditions 732b-732n). When the individual modifiers 730a-730n are applied, the modifier conditions may over-ride the rules 722a-722n of the selected individual limitation profiles 720a-720n. The modifier conditions 732a-732n may temporarily increase and/or decrease the restrictions of the rules 722a-722n. The modifier conditions 732a-732n may temporarily add to and/or remove the rules 722a-722n.

In one example, if the modifier condition 732a is that a driving instructor is present in the vehicle 50, and the modifier condition 732a is met, the modifier condition 732b may be an adjustment to the location rule 722a. For example, the location rule 722a may limit a teenager from driving on freeways, but the modifier condition 732b may allow the teenager to driver on freeways when the driving instructor is present (e.g., the modifier condition 732b may decrease the geolocation restriction). In another example, if the modifier condition 732a is that a child is present in the vehicle 50, and the modifier condition 732a is met, the modifier condition 732c may be an adjustment to the speed rule 722b. For example, the speed rule 722b may limit a parent from driving above 70 mph, but the modifier condition 732c may lower the speed restriction to 60 mph when the child is present (e.g., the modifier condition 732c may increase the restriction). In yet another example, if the modifier condition 732a is that a parent is present in the vehicle 50, and the modifier condition 732a is met, the modifier condition 732d may be an adjustment of a reaction for one or more of the rules 722a-722n. For example, the reaction for one or more of the rules 722a-722n may be to send a parent a notification (e.g., a text message) when the driver 452a breaks one of the rules 722a-722n, but when the adult is present, the modifier condition 732d may cause the infotainment center 510b to play an audible alert when one of the rules 722a-722n is broken (e.g., the modifier condition 732d may change the reaction to be performed). The number, type, condition and/or reactions implemented by the modifier conditions 732a-732n may be varied according to the design criteria of a particular implementation.

The rules 722a-722n and/or the modifier conditions 732a-732n may be pre-defined. In one example, parents may define the rules 722a-722n and/or modifier conditions 732a-732n for their children. In another example, the rules 722a-722n and/or modifier conditions 732a-732n may be defined as a condition of a court judgment and/or probation conditions. For example, the driver 452a may be convicted of impaired driving and may not be allowed to drive, except for driving to and from work. The rules 722a-722n and/or modifier conditions 732a-732n may be used to ensure that the driver only drives directly to work and then directly home. In another example, the rules 722a-722n and/or modifier conditions 732a-732n may be used to help ensure that the driver 452a complies with a restraining order.

In some embodiments, the reactions defined by the rules 722a-722n and/or modifier conditions 732a-732n may generate a log file. The reaction may be to log every time that the driver 452a meets the conditions (e.g., performs an infraction) defined by the rules 722a-722n and/or modifier conditions 732a-732n. For example, every time the driver 452a exceeds the speed restriction may meet the condition defined by the rules 722a-722n and/or modifier conditions 732a-732n and the occurrence may be logged. In another example, every time the driver 452a travels outside of the geo-restricted area defined by the rules 722a-722n and/or modifier conditions 732a-732n may meet the condition and the occurrence may be logged. In some embodiments, the log file reaction may be used to gather data for driver testing (e.g., to get a driver's license).

Figure 12:
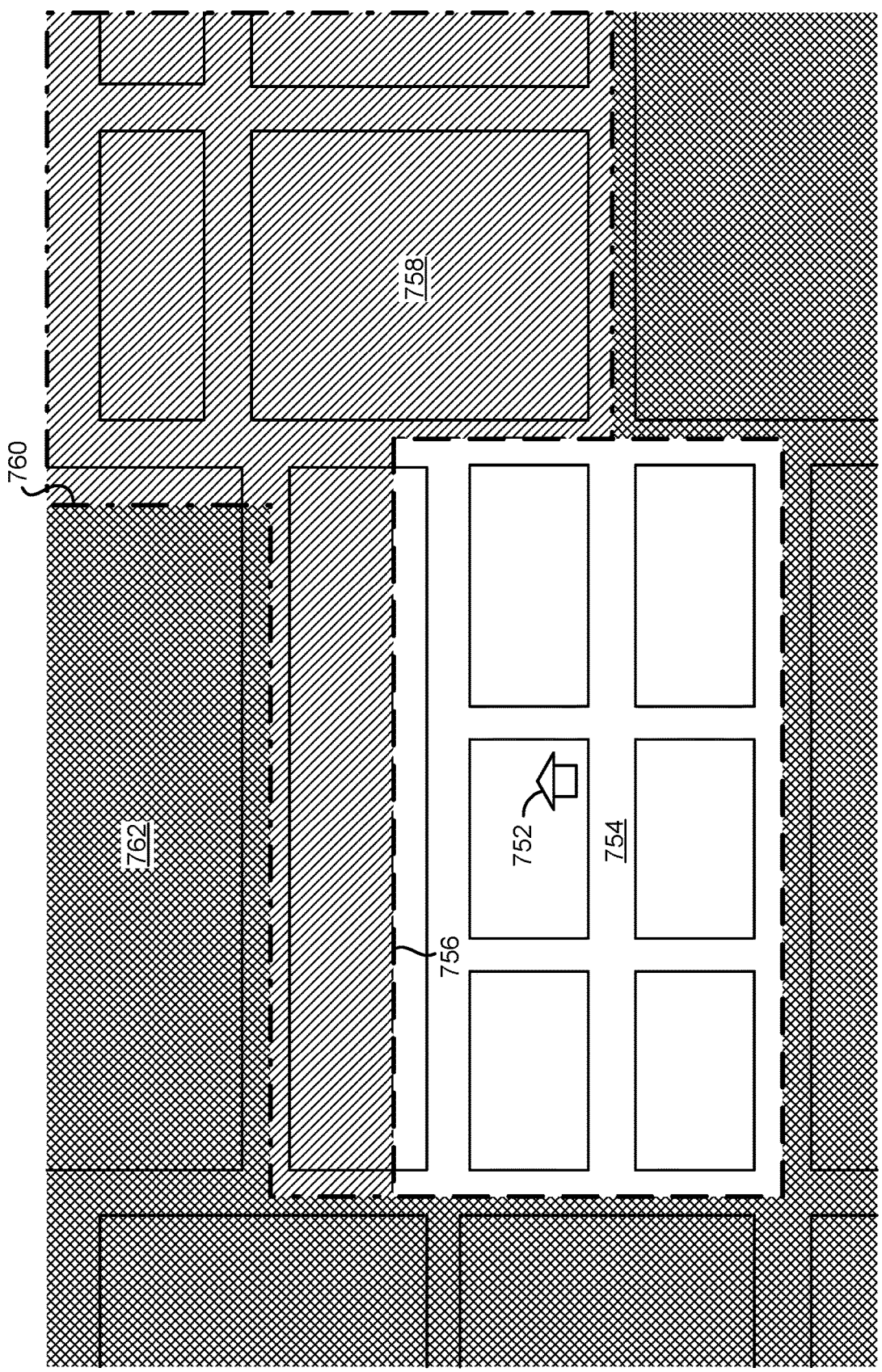
FIG. 12 is a diagram illustrating an example visualization of geo-restricted locations for an example limitation profile.

Referring to FIG. 12, a diagram illustrating an example visualization 750 of geo-restricted locations for an example limitation profile is shown. The example visualization 750 may represent an overhead map of an area. A home location 752 is shown. An inner area 754 is shown around the home location 752. A first border 756 is shown around the inner area 754. A middle area 758 is show next to the inner area 754. A second border 760 is shown around the middle area 758. An outer area 762 is shown outside of the first border 756 and the second border 760.

The visualization 750 may represent the rules 722a-722n and/or the modifier conditions 732a-732n for the limitation profiles 710. For example, the visualization 750 may represent a geo-restriction rule 722a for the individual limitation profile 720i. In an example, the driver 452a of the vehicle 50 may be identified as an individual corresponding to the user characteristics 700i. The individual limitation profile 720i may correspond to the individual identified using the user characteristics 700i (e.g., based on the detected face 702d).

The geo-restriction rule 722a may be a condition that defines where the driver 452a is permitted to drive. For example, the home location 752 may be a reference point for the condition of the geo-restriction rule 722a. The first border 756 may represent a range with respect to the home location 752 for the geo-restriction rule 722a defining where the driver 452a is permitted to drive. In the example shown, according to the geo-restriction rule 722a, the driver 452a may drive within the area 754 and the processors 106a-106n may not perform a reaction. The sensors 114 may monitor the location of the vehicle 50 (e.g., using GPS/GNSS) to determine where the vehicle 50 is located. If the driver 452a stays within the inner area 754, the condition of the rule 722a may not be met. The condition of the rule 722a may be met if the driver 452a drives the vehicle 50 outside of the inner area 754 (e.g., into the middle area 758 and/or the outer area 762). If the driver 452a takes the vehicle outside of the inner area 754, the infraction may be detected and the decision module 158 may select the reaction defined by the geo-restriction rule 722a.

The reaction selected may be an escalating reaction. For example, if the driver 452a takes the vehicle 50 into the middle area 758, a first reaction may be performed. For example, the first reaction may be to provide a notification on the infotainment center 510b notifying the driver 452a to turn around. If the driver 452a takes the vehicle 50 into the outer area 760, a second (e.g., escalating) reaction may be performed. For example, the second reaction may be autonomously stop the vehicle 50 and drive back to the inner area 754. The escalation of reactions may be defined by the geo-restriction rule 722a.

In an example, the modifier 730j may apply to the limitation profile 720i corresponding to the user 700i. The modifier 730j may have a modifier type 732a of an older sibling in the vehicle 50. For example, if the older sibling of the driver 452a is present in the vehicle 50, the modifier 730j may be applied to the limitation profile 720i. The modification condition 732b may be a geo-restriction modification for the geo-restriction rule 722a. For example, the modification condition 732b may increase the range of the condition to the second boundary 760. With the older sibling in the vehicle 50, the driver 452a may take the vehicle 50 within the inner area 754 and the middle area 758. Since the modified condition 732b is not met unless the vehicle 50 goes into the outer area 762, the reaction may not be performed unless the driver 452a takes the vehicle 50 into the outer area 762.

Figure 13:
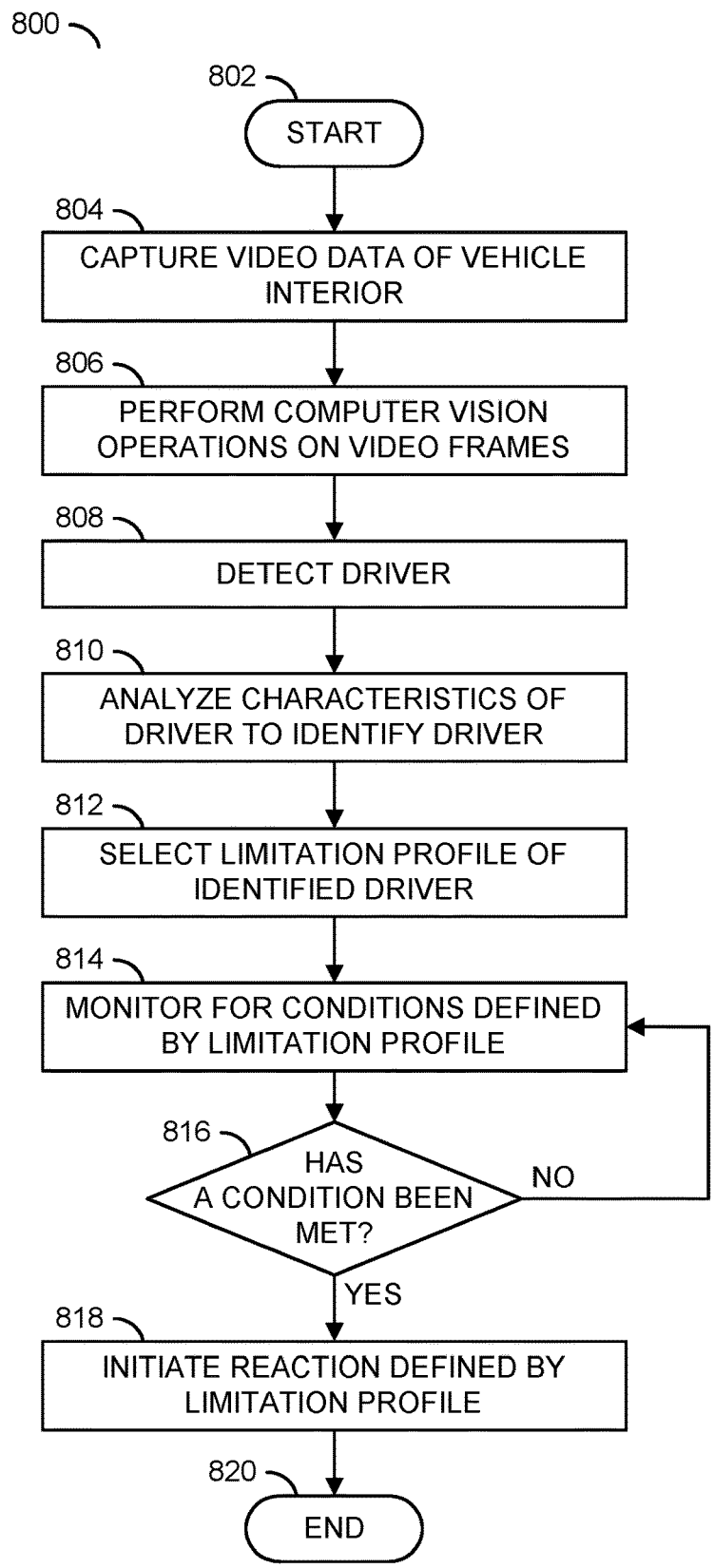
FIG. 13 is a flow diagram illustrating a method for selecting a limitation profile for a driver using computer vision.

Referring to FIG. 13, a method (or process) 800 is shown. The method 800 may select a limitation profile for a driver using computer vision. The method 800 generally comprises a step (or state) 802, a step (or state) 804, a step (or state) 806, a step (or state) 808, a step (or state) 810, a step (or state) 812, a step (or state) 814, a decision step (or state) 816, a step (or state) 818, and a step (or state) 820.

The step 802 may start the method 800. In the step 804, the capture devices 102a-102n may capture video data of the interior of the vehicle 50. For example, the capture devices 102a-102n may generate and present the signals FRAMES_A-FRAMES_N to the processors 106a-106n. Next, in the step 806, the processors 106a-106n (e.g., the CNN module 150) may perform the computer vision operations on the video frames FRAMES_A-FRAMES_N. In the step 808, the CNN module 150 may detect the driver 452a (e.g., based on a location within the interior of the vehicle 50). Next, the method 800 may move to the step 810.

In the step 810, the processors 106a-106n may analyze the characteristics (e.g., the body parts 502a-502n and/or perform facial recognition operations on the face 552a) of the driver 452a to identify the driver 452a. For example, the CNN module 150 may perform the computer vision operations and the decision module 158 may compare the detected characteristics 502a-502n of the driver 452a with the user characteristics 702a-702n stored in the user characteristic profiles 700a-700n in order to identify the driver 452a as a specific match to a previously known person. Next, in the step 812, the processors 106a-106n may select from the limitation profiles 710 for one of the individual limitation profiles 720a-720n corresponding to the identified driver 452a. For example, the limitation profiles 710 may comprise one of the individual limitation profiles 720a-720n and/or one or more of the individual modifiers 730a-730n. In the step 814, the processors 106a-106n may monitor for the conditions defined by the selected one of the individual limitation profiles 720a-720n. In an example, the rules 722a-722n may define the condition. Next, the method 800 may move to the decision step 816.

In the decision step 816, the processors 106a-106n may determine whether the condition has been met. In an example, the sensors 114 may monitor the characteristics of the vehicle 50 and/or the processors 106a-106n may perform the computer vision operations to determine whether the data acquired matches any of the conditions. If the condition has not been met (e.g., the driver 452a has not performed an infraction defined by the rules 722a-722n), the method 800 may return to the step 814. If the condition has been met (e.g., the driver 452a has performed an infraction), the method 800 may move to the step 818. In the step 818, the processors 106a-106n may initiate the reaction(s) defined by the selected one of the individual limitation profiles 720a-720n. In an example, the rules 722a-722n may define one or more reactions to perform when the corresponding condition is met. Next, the method 800 may move to the step 820. The step 820 may end the method 800.

Figure 14:
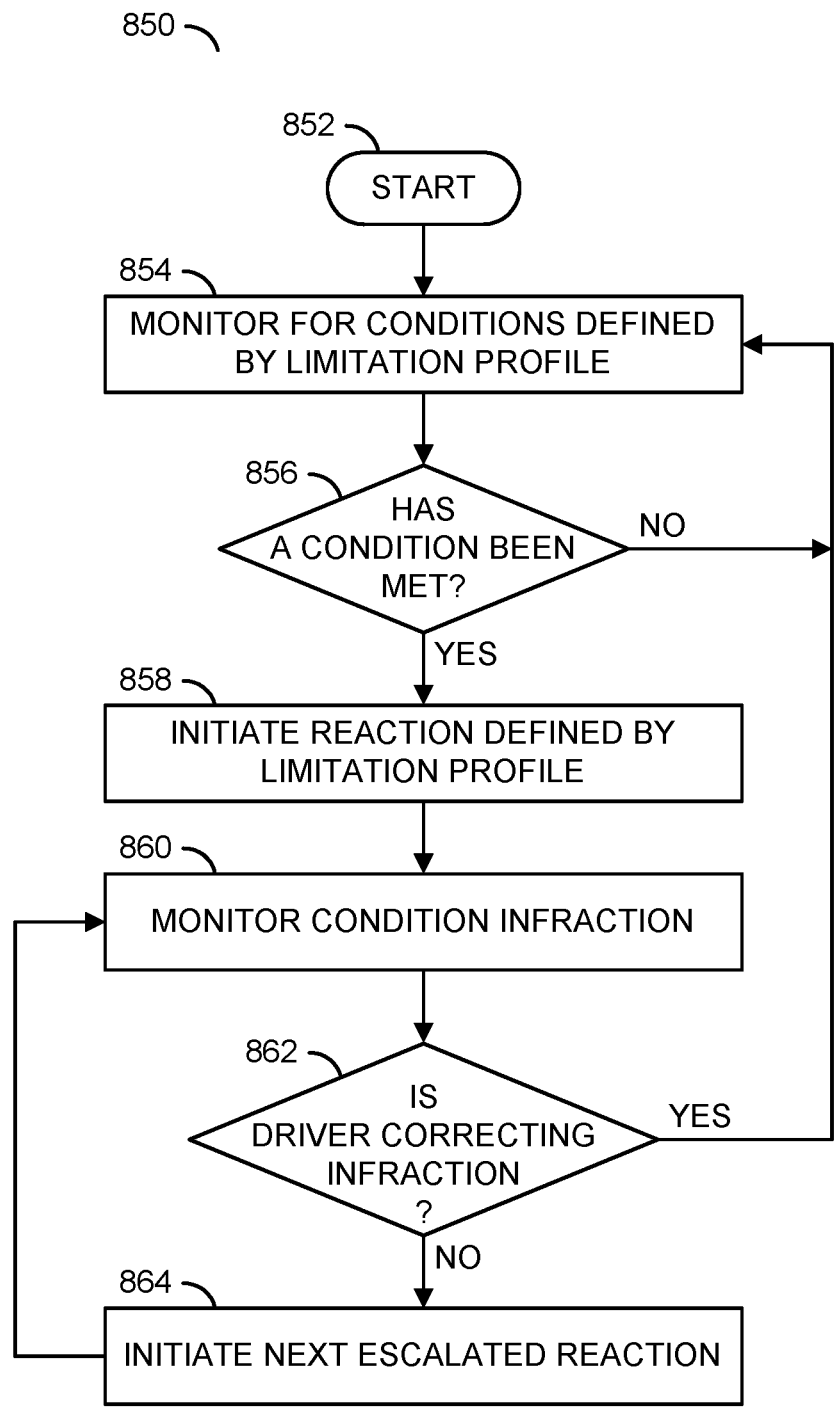
FIG. 14 is a flow diagram illustrating a method for initiating escalating reactions in response to the conditions.

Referring to FIG. 14, a method (or process) 850 is shown. The method 850 may initiate escalating reactions in response to the conditions. The method 850 generally comprises a step (or state) 852, a step (or state) 854, a decision step (or state) 856, a step (or state) 858, a step (or state) 860, a decision step (or state) 862, and a step (or state) 864.

The step 852 may start the method 850. In the step 854, the processors 106a-106n may monitor for the conditions defined by the selected one of the individual limitation profiles 720a-720n. Next, the method 850 may move to the decision step 856.

In the decision step 856, the processors 106a-106n may determine whether one or more of the conditions have been met. For example, the rules 722a-722n may define the conditions. If the condition has not been met, the method 850 may return to the step 854. If the condition has been met (e.g., an infraction has occurred), the method 850 may move to the step 858. In the step 858, the processors 106a-106n may initiate one or more reactions defined by the selected one of the limitation profiles 720a-720n. In an example, the processors 106a-106n may generate the signal VCTRL to enable the actuators 116 to perform the reaction. Next, in the step 860, the processors 106a-106n may monitor the condition infraction. For example, the condition infraction may be monitored to determine if the condition is continuing to be met and/or if the driver 452a has performed a correction so that the infraction no longer occurs. Next, the method 850 may move to the decision step 862.

In the decision step 862, the decision module 158 may determine whether the driver 452a is correcting (or has corrected) the infraction. For example, the processors 106a-106n may check for changes to the readings provided by the sensors 114 (e.g., check whether the vehicle 50 is slowing down for a speed restriction). In another example, the processors 106a-106n may perform the computer vision operations to determine if the infraction is being resolved (e.g., if the condition is that a seatbelt is worn, then the computer vision operations may detect whether the driver 452a is in the process of connecting the seatbelt). If the driver 452a is correcting (or has corrected) the infraction, the method 850 may return to the step 854. If the driver 452a is not correcting (or has not corrected) the infraction, the method 850 may move to the step 864. In the step 864, the processors 106a-106n may initiate a next one of the escalated reactions. In an example, a first reaction may be to log the infraction, and if the infraction is not corrected then a next escalated reaction may be to provide an alert and if the infraction is still not corrected then the next escalated reaction may be to autonomously control the vehicle 50. Next, the method 850 may return to the step 860. The steps 860-864 may be repeated (e.g., with different escalating reactions) until the infraction has been corrected.

Figure 15:
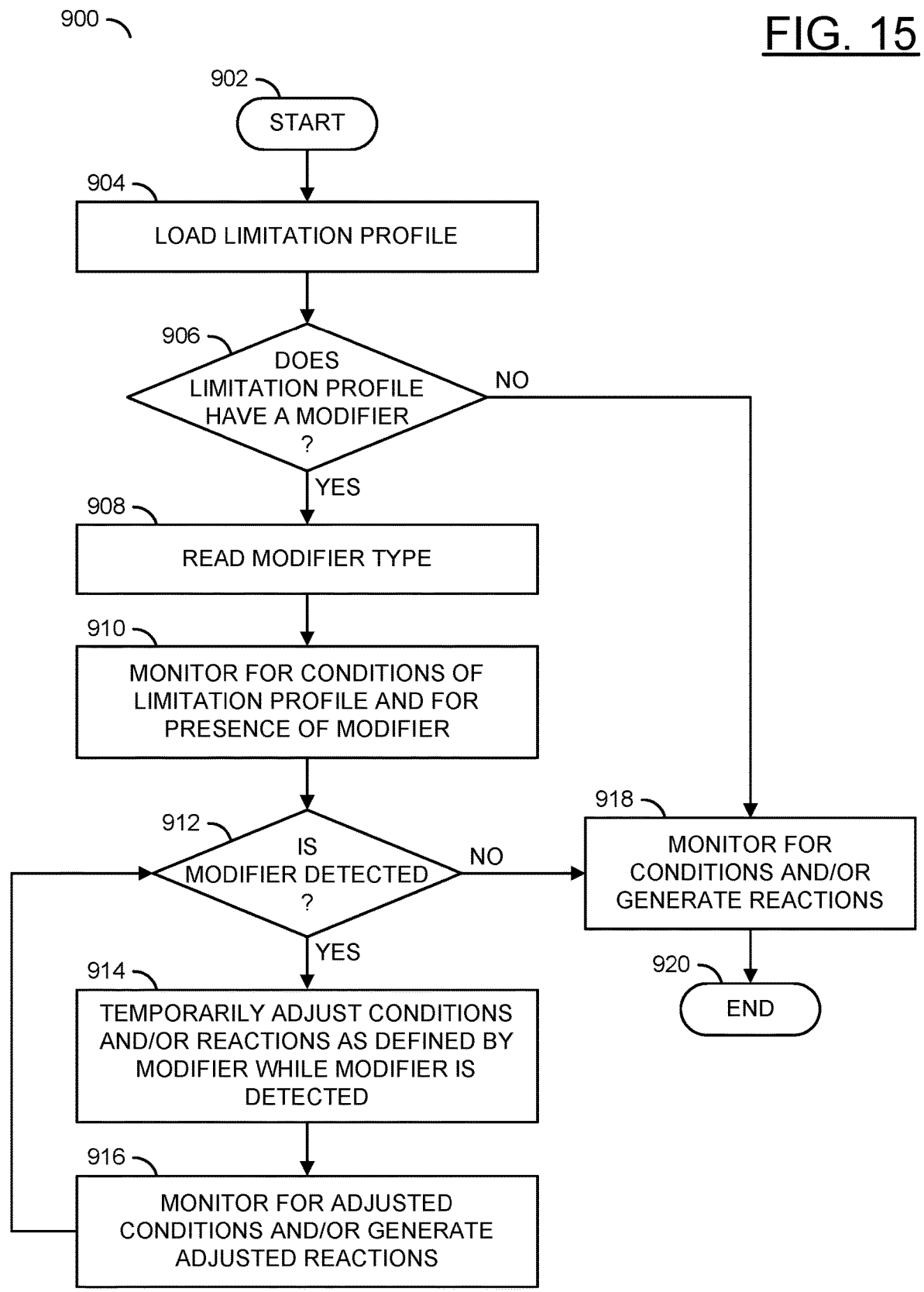
FIG. 15 is a flow diagram illustrating a method for applying modifiers to conditions and/or reactions of the limitation profile.

Referring to FIG. 15, a method (or process) 900 is shown. The method 900 may apply modifiers to conditions and/or reactions of the limitation profile. The method 900 generally comprises a step (or state) 902, a step (or state) 904, a decision step (or state) 906, a step (or state) 908, a step (or state) 910, a decision step (or state) 912, a step (or state) 914, a step (or state) 916, a step (or state) 918, and a step (or state) 920.

The step 902 may start the method 900. In the step 904, the processors 106a-106n may load a selected one of the limitation profiles 720a-720n. Next, the method 900 may move to the decision step 906.

In the decision step 906, the processors 106a-106n may determine whether the selected one of the individual limitation profiles 720a-720n has an associated one of the modifiers 730a-730n. If the selected one of the limitation profiles 720a-720n does not have an associated one of the modifiers 730a-730n, the method 900 may move to the step 918. If the selected one of the limitation profiles 720a-720n does have an associated one of the modifiers 730a-730n, the method 900 may move to the step 908.

In the step 908, the processors 106a-106n may read the modifier type. For example, the modifier type may be the modifier condition 732a of the associated one of the modifiers 730a-730n. Next, in the step 910, the processors 106a-106n may monitor for the conditions of the limitation profile (e.g., based on the rules 722a-722n) and for the presence of the associated modifier 730a-730n (e.g., based on detecting the type 732a). For example, readings from the sensors 114 and/or computer vision operations performed by the processors 106a-106n may detect whether the modifier 730a-730n is present. Next, the method 900 may move to the decision step 912.

In the decision step 912, the processors 106a-106n may determine whether the associated modifier(s) 730a-730n have been detected. If the associated modifier is present, the method 900 may move to the step 914. In the step 914, the processors 106a-106n may temporarily adjust the rules 722a-722n based on the conditions and/or reactions as defined by the modifier conditions 732a-732n while the associated modifier(s) 730a-730n are detected. For example, the modifier conditions 732a-732n may temporarily override the rules 722a-722n. Next, in the step 916, the processors 106a-106n may monitor for the adjusted conditions and/or generate the adjusted reactions when the adjusted conditions are met. Next, the method 900 may return to the decision step 912.

In the decision step 912, if the associated one of the modifiers 730a-730n is not present, the method 900 may move to the step 918. In the step 918, the processors 106a-106n may monitor for the conditions and/or generate the reactions as defined by the rules 722a-722n. Next, the method 900 may move to the step 920. The step 920 may end the method 900.

Figure 16:
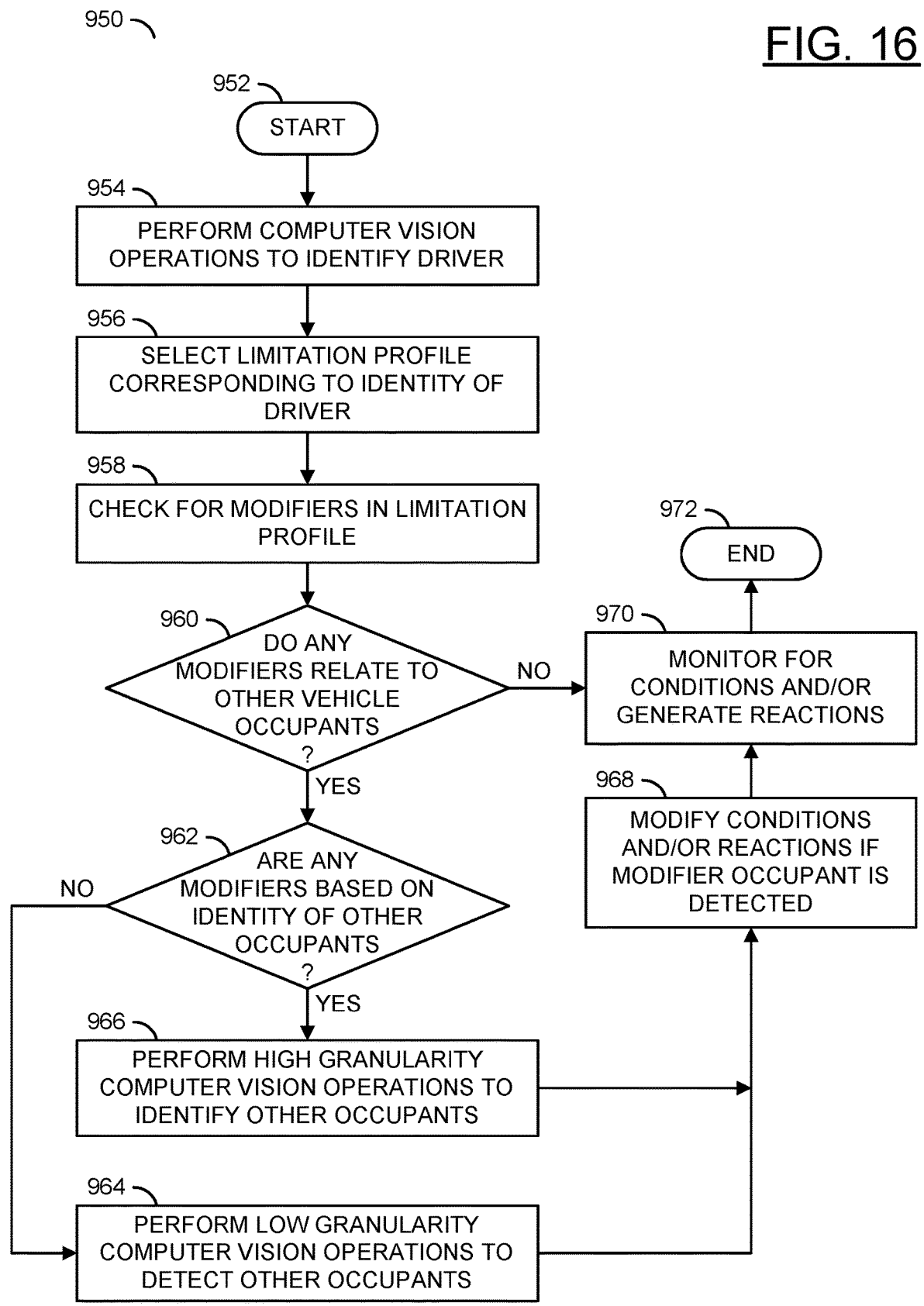
FIG. 16 is a flow diagram illustrating a method for implementing computer vision operations to detect passengers based on modifiers.

Referring to FIG. 16, a method (or process) 950 is shown. The method 950 may implement computer vision operations to detect passengers based on modifiers. The method 950 generally comprises a step (or state) 952, a step (or state) 954, a step (or state) 956, a step (or state) 958, a decision step (or state) 960, a decision step (or state) 962, a step (or state) 964, a step (or state) 966, a step (or state) 968, a step (or state) 970, and a step (or state) 972.

The step 952 may start the method 950. In the step 954, the processors 106a-106n may perform the computer vision operations to identify the driver 452a. Next, in the step 956, the processors 106a-106n may select one of the individual limitation profiles 720a-720n corresponding to the identity of the driver 452a. In the step 958, the processors 106a-106n may check for modifiers 730a-730n associated with the selected one of the limitation profiles 720a-720n for the driver 452a. Next, the method 950 may move to the decision step 960.

In the decision step 960, the processors 106a-106n may determine whether any of the corresponding modifiers 730a-730n relate to other occupants in the vehicle 50. For example, the modifier type 732a may be analyzed to determine if the modifier applies when one or more passengers 452b-452n are in the vehicle 50 with the driver 452a. If the corresponding modifiers 730a-730n do not relate to the other occupants in the vehicle 50, then the method 950 may move to the step 970. If the corresponding modifiers 730a-730n do relate to the other occupants in the vehicle 50, then the method 950 may move to the decision step 962.

In the decision step 962, the processors 106a-106n may determine whether any of the corresponding modifiers 730a-730n are based on the identity of the other occupants 452b-452n. For example, the modifier type 732a may be analyzed to determine if the modifier applies to a class of occupants (e.g., children, whether any occupant is present, an adult, etc.) or if the modifier applies to a specific individual that would need to be identified. If the corresponding modifiers 730a-730n are not based on the identity of the other occupants 452b-452n, then the method 950 may move to the step 964. In the step 964, the processors 106a-106n may perform low granularity computer vision operations to detect the other occupants. For example, if an identity is not needed, the processors 106a-106n may conserve processing resources. Next, the method 950 may move to the step 968.

In the decision step 962, if at least one of the corresponding modifiers 730a-730n are based on the identity of the other occupants 452b-452n, then the method 950 may move to the step 966. In the step 966, the processors 106a-106n may perform high granularity computer vision operations identify the other occupants 456b-456n. For example, the high granularity computer vision operations may be used to distinguish a particular individual. Next, the method 950 may move to the step 968. In the step 968, the processors 106a-106n may modify the conditions and/or reactions if the modifier occupant is detected. Next, the method 950 may move to the step 970.

In the step 970, the processors 106a-106n may monitor for the conditions and/or generate the reactions (e.g., according to the rules 722a-722n and/or the modifier conditions 732a-732n). Next, the method 950 may move to the step 972. The step 972 may end the method 950.

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data corresponding to users of a vehicle; and
a processor configured to (i) process said pixel data arranged as video frames, (ii) perform computer vision operations to detect objects in said video frames by (a) applying a feature detection window to each of a plurality of layers in each of the video frames and (b) performing feature extraction based on weight values for each of said plurality of layers in said video frames, (iii) detect users of said vehicle based on said objects detected in said video frames, (iv) determine a limitation profile for said users, (v) monitor for conditions provided by said limitation profile and (vi) generate a reaction if one or more of said conditions are met, wherein said weight values are determined by said processor analyzing training data prior to said feature extraction.

2. The apparatus according to claim 1, wherein (i) said limitation profile is determined in response to characteristics of said users detected using said computer vision operations on each of said users and (ii) said characteristics of said users comprise a shape and size of body parts of said users.

3. The apparatus according to claim 1, wherein (i) said computer vision operations further comprise (i) extracting facial features from each of said users detected, (ii) comparing said facial features detected with stored face recognition profiles and (iii) said conditions provided by said limitation profile are pre-defined and specific to one of said users corresponding to a matching one of said face recognition profiles.

4. The apparatus according to claim 1, wherein said reaction comprises a warning to said users of said vehicle.

5. The apparatus according to claim 1, wherein said reaction comprises a notification sent to a remote device.

6. The apparatus according to claim 1, wherein said reaction selected by said processor is implemented autonomously by said vehicle to adjust vehicle components.

7. The apparatus according to claim 1, wherein said limitation profile comprises an association of said reaction with said conditions.

8. The apparatus according to claim 1, wherein said conditions of said limitation profile comprise at least one of: a geolocation restriction, a time of day, a speed restriction, an acceleration restriction, vehicle occupancy restrictions, days of the week, or infotainment center settings.

9. The apparatus according to claim 1, wherein said limitation profile is further determined based on supplemental information received from a smartphone.

10. The apparatus according to claim 1, wherein said computer vision operations are implemented by a convolutional neural network.

11. The apparatus according to claim 10, wherein said convolutional neural network is trained using fleet learning.

12. The apparatus according to claim 11, wherein (i) said fleet learning comprises capturing reference images using capture devices implemented in a plurality of vehicles, (ii) said reference images comprise occupied interiors of said plurality of vehicles, (iii) said reference images are used as said training data for said convolutional neural network and (iv) said training data comprises said reference images from many different vehicles.

13. The apparatus according to claim 1, wherein (i) said limitation profile further comprises a modifier, (ii) said processor is further configured to monitor for a modifier condition corresponding to said modifier and (iii) said modifier temporarily changes said limitation profile by adjusting at least one of (a) said conditions and (b) said reaction.

14. The apparatus according to claim 1, wherein (i) said interface is configured to receive said pixel data from a stereo camera and (ii) said computer vision operations comprise performing stereo vision to determine depth information based on said video frames captured by said stereo camera.

15. The apparatus according to claim 1, wherein said conditions are monitored by reading from sensors of said vehicle.

16. The apparatus according to claim 1, wherein said computer vision operations are performed by applying a convolution operation using matrix multiplication of said plurality of layers defined by said feature detection window.

17. An apparatus comprising:
an interface configured to receive pixel data corresponding to users of a vehicle; and
a processor configured to (i) process said pixel data arranged as video frames, (ii) perform computer vision operations to detect objects in said video frames, (iii) detect users of said vehicle based on said objects detected in said video frames, (iv) determine a limitation profile for said users, (v) monitor for conditions provided by said limitation profile, (vi) generate a reaction according to said limitation profile if one or more of said conditions are met, (vii) monitor for a modifier condition that corresponds to said limitation profile and (viii) temporarily change at least one of (a) said conditions and (b) said reaction while said modifier condition is present, wherein (a) said limitation profile is determined in response to characteristics of said users, (b) said characteristics of said users are determined by performing said computer vision operations on each of said users, (c) said change is reverted when said modifier condition is no longer present and (d) said change corresponding to said modifier condition is determined based on a factor detected by said processor.

18. The apparatus according to claim 17, wherein (i) said factor comprises a detection of an adult passenger in said vehicle, (ii) said change comprises disabling said reaction and (iii) said modifier condition applies to said limitation profile for a young driver.

19. The apparatus according to claim 17, wherein (i) said processor performs said computer vision operations with a low granularity in a first mode when said factor does not comprise an identity of one of said users and (ii) said processor performs said computer vision operations with a high granularity in a second mode when said factor does comprise said identity of one of said users.

20. The apparatus according to claim 17, wherein said modifier condition is configured to change said conditions in response to a number of occupants in said vehicle.

* * * * *